(12) United States Patent
Lemma et al.

(10) Patent No.: US 8,757,490 B2
(45) Date of Patent: Jun. 24, 2014

(54) METHOD AND APPARATUS FOR ENCODING AND READING OPTICAL MACHINE-READABLE DATA CODES

(75) Inventors: Dereje Teferi Lemma, Addis Ababa (ET); Josef Bigun, Zurich (CH)

(73) Assignee: Josef Bigun, Halmstad (SE)

( * ) Notice: Subject to any disclaimer, the term of this patent is extended or adjusted under 35 U.S.C. 154(b) by 504 days.

(21) Appl. No.: 12/813,921

(22) Filed: Jun. 11, 2010

(65) Prior Publication Data

US 2011/0303748 A1     Dec. 15, 2011

(51) Int. Cl.
  *G06K 19/00* (2006.01)
(52) U.S. Cl.
  USPC ........... 235/454; 235/435; 235/439; 235/487; 235/492
(58) Field of Classification Search
  USPC ........................... 235/435, 487, 494; 382/181
  See application file for complete search history.

(56) References Cited

U.S. PATENT DOCUMENTS

| | | | | |
|---|---|---|---|---|
| 4,745,269 | A * | 5/1988 | Van Gils | 235/487 |
| 5,128,528 | A * | 7/1992 | Heninger | 235/470 |
| 5,612,524 | A | 3/1997 | Sant'Anselmo et al. | |
| 6,360,948 | B1 * | 3/2002 | Yang et al. | 235/462.1 |
| 2005/0051622 | A1 * | 3/2005 | Mak | 235/384 |
| 2005/0222722 | A1 * | 10/2005 | Chen | 701/23 |
| 2006/0157574 | A1 * | 7/2006 | Farrar et al. | 235/494 |

OTHER PUBLICATIONS

Multi-view and Multi-scale Recognition of Symmetric Patterns, Dereje Teferi and Joseph Bigun, Halmstad University, Halmstad Sweden, 2009.
Calibration Procedure for Short Focal Length Off-the-shelf CCD Cameras, Janne Heikkila and Olli Silven, International Conf. on Pattern Recognition, ICPR-96, IEEE Computer Society, pp. 166-170, (1996).
A Computational Approach to Edge Detection, John Canny, IEEE Trans. Pattern Analysis and Machine Intelligence, vol. 8, pp. 679-714 (1986).
A Flexible New Technique for Camera Calibration, Zhengyou Zhang, Technical Report, MSR-TR-98-71, Microsoft Research, Microsoft Corporation, (1998).
Recognition and Evaluation by Video Synthesis Methods and Symmetry Features, Dereje Teferi Lemma, Thesis, Halmstad University, Halmstad, Sweden (2009).
Vision With Direction, A Systematic Introduction to Image Processing and Computer Vision, Josef Bigun, Chapter 11 (2006).

* cited by examiner

*Primary Examiner* — Michael G Lee
*Assistant Examiner* — Matthew Mikels
(74) *Attorney, Agent, or Firm* — Gordon & Jacobsen, PC

(57) ABSTRACT

A method and apparatus for data encoding and optical recognition of encoded data includes generating symbols that represent data using angles (rather than linear dimensions as used for conventional bar codes). One embodiment uses spirals isocurves. Another uses parabolas isocurves. Methods for visually depicting such symbols, including symbols having gray values are disclosed. Methods for machine-based detection and decoding of such symbols regardless of their orientation relative to the machine is also disclosed.

38 Claims, 14 Drawing Sheets

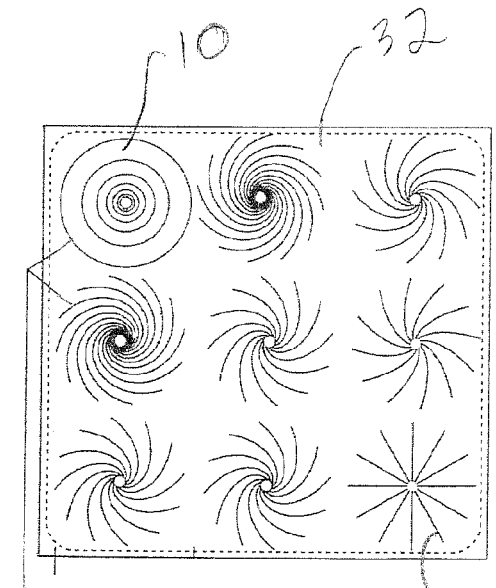
symbols
FIG. 8A    18 symbol origins RD
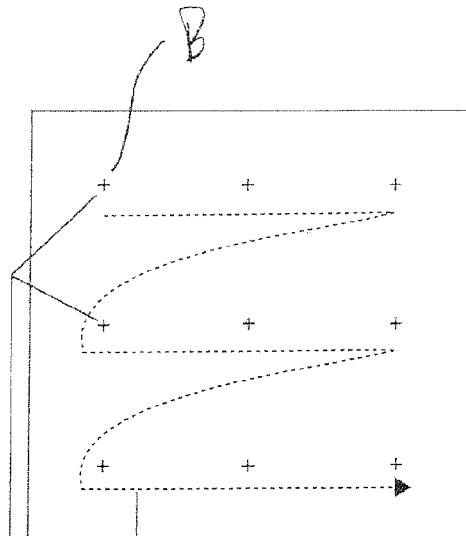
FIG. 8B
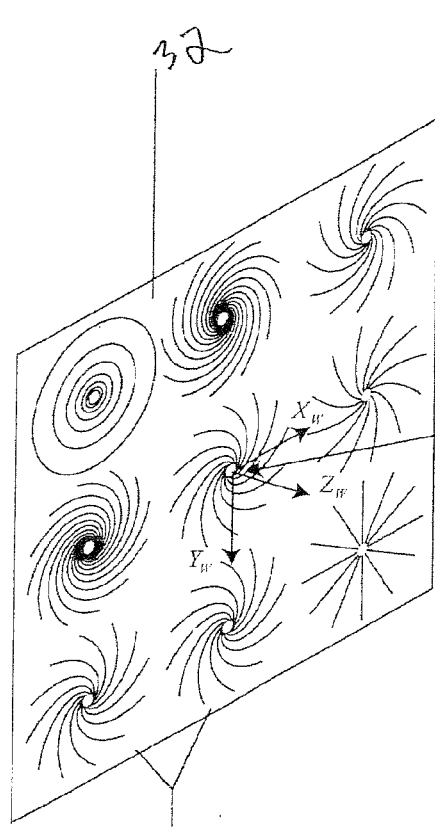
FIG. 9    510  512  504

METHOD AND APPARATUS FOR ENCODING AND READING OPTICAL MACHINE-READABLE DATA CODES

BACKGROUND OF THE INVENTION

1. Field of the Invention

This invention relates broadly to optical machine-readable data codes. More particularly, this invention relates to methods and apparatus for generating and printing (or displaying) optical machine-readable data codes as well as methods and apparatus for reading and decoding optical machine-readable data codes.

2. State of the Art

There are many different types of optical machine-readable data codes in use today. The constructs and underlying meaning for a set of data codes is defined by a symbology. The specification of a symbology includes the encoding of the single digits/characters of a message (also commonly referred to as a codeword) as well as constructs for identifying the boundary of the encoded data. For example, modern bar code symbologies typically include a quiet zone as well as unique start and stop markers to aid in identifying the boundary of the encoded data. The bar code symbologies can also employ a check digit for error detection as is well known.

There are a wide variety of data code symbologies in use today, including linear bar codes that are typically be read by a laser scanner as well as two dimensional data codes that are typically read by a digital camera sensor such as a charge coupled device (CCD). Most data code symbologies are designed to be printed on a label or some other object. Some data code symbologies are designed to be displayed ephemerally, e.g. on a television screen.

Typically, data code symbologies are read by a machine with the help of a human. The human locates the data code and orients the data code and/or the machine so that the machine can read the data code.

SUMMARY OF THE INVENTION

The present invention is based on the novel premise that it is advantageous to provide an optical machine-readable data code symbology that can be read by a machine without the assistance of a human.

According to the invention, an improved data code symbology is provided that includes a set of symbols with isocurves, wherein differentiation amongst symbols is dictated by characteristic directions along the isocurves of the symbols. More particularly, differentiation amongst symbols can be defined by the intersection angles of isocurves with one or more predetermined reference curves. Such reference curves do not need to be explicitly marked into symbol images as they can be implicitly available.

According to a first embodiment of the invention, an improved data code symbology is provided that includes a set of symbols which are symmetrical about their centers (origin in both Cartesian and polar coordinates). In addition, the symbols are each composed of a predetermined number of spiral lines (e.g., twelve lines) that extend radially from their respective center. For each symbol, an angle θ signifies the angle at which the spiral lines of the symbol cross a concentric circle at an arbitrary point in a given spiral line. The angle θ, which is referred to herein as the "symbol angle", uniquely identifies a particular symbol amongst other symbols of the set. Such spiral line symbols can be used in conjunction with a bulls eye symbol that includes a number of concentric circles centered about the origin of the symbol. In this case, the symbol angle for the bulls eye symbol is 0 radians. Importantly, the symbol angle of each one of the symbols is invariant to rotation and/or scaling effects. That is the symbol angle of a given symbol is not affected if the given symbol is rotated and/or scaled in any amount (and in any order).

In accordance with a second embodiment of the invention, an improved data code symbology is provided that includes a set of symbols which are symmetrical about their centers (origin in both Cartesian and polar coordinates). In addition, the symbols are each composed of a predetermined number of spiral gray scale features (e.g., twelve spiral gray scale features) that extend radially from their respective center. For each symbol, an angle θ signifies the angle at which the spiral gray scale feature of the symbol cross a concentric circle at an arbitrary point in a given spiral line. The angle θ, which is referred to herein as the "symbol angle", uniquely identifies a particular symbol amongst other symbols of the set. Such spiral gray scale symbols can be used in conjunction with a bulls eye symbol that includes a number of concentric circles or gray scale features centered about the origin of the symbol. In this case, the symbol angle for the bulls eye symbol is 0 radians. Importantly, the symbol angle of each one of the symbols is invariant to rotation and/or scaling effects. That is the symbol angle of a given symbol is not affected if the given symbol is rotated and/or scaled in any amount (and in any order).

Importantly, rotation and scaling are two severe distortions that effect images of moving objects observed by a fixed camera or stationary objects observed by a moving camera. Symbologies that are affected by rotation and/or scaling are difficult to read, particularly under circumstances where such distortions are significant. The symbologies of the first and second embodiments avoid these problems.

Alternate symbologies of the present invention employ symbols that use harmonic isocurves as described herein.

According to the methods of the invention, data encoding comprises arranging a plurality of symbols in a matrix, e.g. 1×3 or 3×3, with one corner of the matrix containing the beginning symbol and the opposite corner containing the ending symbol. The inclusion of the beginning symbol or end symbol as part of the matrix is optional. They are used to make the determination of the reading direction easier. Even in the case where the matrix does not include a beginning symbol or end symbol, it is possible to construct the reading direction, but it can be more error prone. The symbols of the matrix can be from one symbology (or from multiple symbologies) as described herein.

According to other methods of the invention, machine-based detection and decoding of the symbol matrices described herein begins by acquiring an image of the symbol matrix, identifying the symbols, establishing the symbol positions and reading direction, and outputting the symbols of the matrix. In the preferred embodiment, for one dimensional matrices, the reading direction is away from the beginning symbol until the last symbol is read. In two dimensional matrices, the beginning symbol is treated as the "upper left corner" of the message and the ending symbol is treated as the lower right corner". The symbols are read from left to right and top to bottom.

Additional optical recognition steps may include providing supplemental illumination, correcting for camera lens distortion, various types of filtering and other image processing procedures.

Several examples of practical applications are provided. In a first example, symbols are used to track and control the location of robots in a factory. A second example shows the identification and tracking of baggage on a conveyor belt. A third example shows how a fork lift uses the symbols to navigate and transport pallets in a warehouse. A fourth example illustrates how a camera equipped motor vehicle can read road signs (including dynamically changing road signs conveying complex messages).

Additional objects and advantages of the invention will become apparent to those skilled in the art upon reference to the detailed description taken in conjunction with the provided figures.

BRIEF DESCRIPTION OF THE DRAWINGS

FIG. 8A is a representation of a two dimensional matrix utilizing the symbology of the first embodiment;

FIG. 8B is a representation of the reading direction for the matrix of FIG. 8A;

FIG. 9 is a schematic representation of the relationship among symbol surface, camera, and space coordinates for the application of FIG. 7;

DETAILED DESCRIPTION

Figure 1:
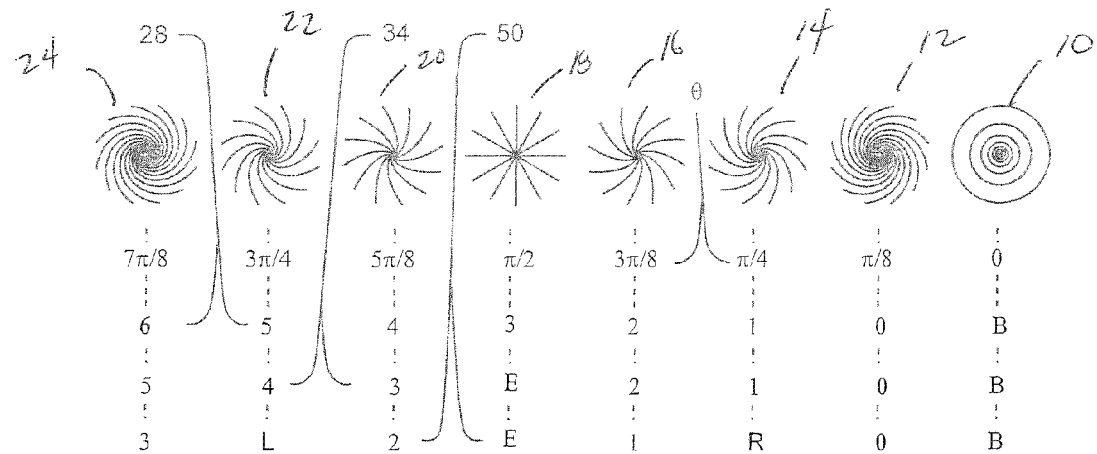
FIG. 1 is a representation of an exemplary optical machine-readable data code symbology according to a first embodiment of the present invention.
Figure 2:
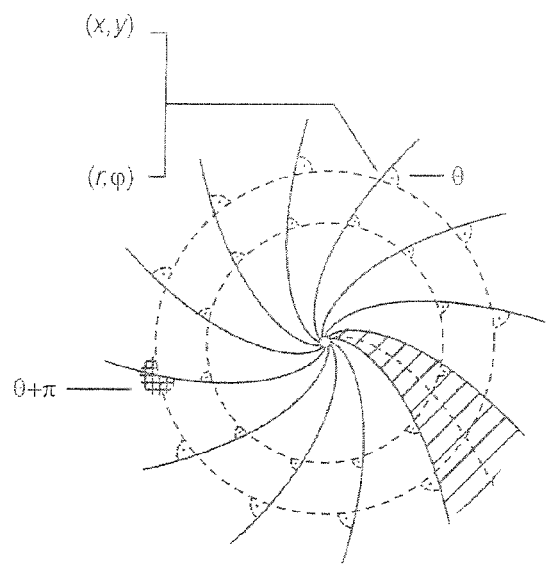
FIG. 2 is an analytical diagram of one of the symbols from FIG. 1.

Turning now to FIGS. 1 and 2, a first embodiment of an optical machine-readable data code symbology according to the invention is provided. The symbology includes eight symbols 10, 12, 14, 16, 18, 20, 22, and 24. The symbols 12, 14, 16, 18, 20, 22 and 24 each comprises a plurality of spiral lines (for example, twelve spiral lines) radiating out from a central origin which can be considered in both Cartesian (x,y) and polar (r,φ) coordinate systems. Each symbol may be said to comprise a plurality of spiral lines such that any point on a given spiral lines satisfies the relationship given in equation (1)

$$\cos(\theta)\log(r)+\sin(\theta)\phi=k \quad (1)$$

where r,φ are the polar coordinates of the point, k is a constant, and θ is the angle formed between a spiral and a circle concentric with the origin.

The parameters (r,φ), represent the distance of the point to the symbol center and the angle the point makes with the (positive) horizontal direction counter-clockwise, respectively, i.e. the polar coordinate system. The function log(r) is the logarithm function applied to r. Throughout this description all logarithm functions are natural logarithms with the natural basis e=2.71828182845904523536 . . . and all angles are measured in radians.

The point (r,φ) can also be represented in the Cartesian coordinates via the usual x and y pair, respectively, as shown in FIG. 2, but it is in the polar coordinates that the spiral lines become particularly simple to describe. It will be noted, however, that the method for printing and/or displaying symbols of this embodiment uses the Cartesian coordinates as detailed below.

By changing the constant k, the points of which fulfill equation (1) for a given spiral line changes to another spiral line for the given symbol. That is each one of the spiral lines of a given symbol has its own numerical constant k different than others.

As shown in FIG. 2, the angle θ signifies the angle at which a spiral line crosses a concentric circle (shown by dotted lines) passing through an arbitrary point (r,φ) on the spiral line. Though the point is an arbitrary point of a spiral line, the angle that it forms with the corresponding concentric circle remains one and the same as the intersection angle of any other point of the same spiral with any of the concentric circles. In fact, the intersection angle remains unchanged not only for a particular spiral line, but also for any other spiral line of the same symbol. All spiral lines of a symbol thus intersect concentric circles with the same angle θ no matter how many spiral lines there are in it, or what the value of the constant k is. The angle θ is referred to herein as "the symbol angle" as it uniquely identifies a particular symbol among other symbols. The angle θ is listed in radians below each symbol in FIG. 1. It will be noted that when the angle θ=π/2, the spiral lines are straight lines extending radially from the origin of the symbol. When the angle θ=0, a bulls eye symbol is defined by a number of concentric circles centered about the origin with exponentially increasing radii.

From the foregoing, those skilled in the art may notice that rotating a symbol of FIG. 1 by any amount, is equivalent to changing only the constant k so that the act of rotation does not change the symbol angle, nor its uniqueness (that its intersection angle with concentric circles remains the same all over a spiral and for every spiral). Even scaling a symbol, that is enlarging or reducing the size of the image of the symbol, does not alter the symbol angle. Scaling too is equivalent to changing the constant k in equation (1). The symbol angle is thus invariant to rotation and scaling in any combination, that is the symbol angle remains the same even if the symbol is both rotated and scaled any amount, and in any order. Scaling and rotation invariance is a significant feature of these spiral curves. Rotation and scaling are two severe distortions that affect images of moving objects observed by a fixed camera or stationary images observed by a moving camera.

Figure 3B:
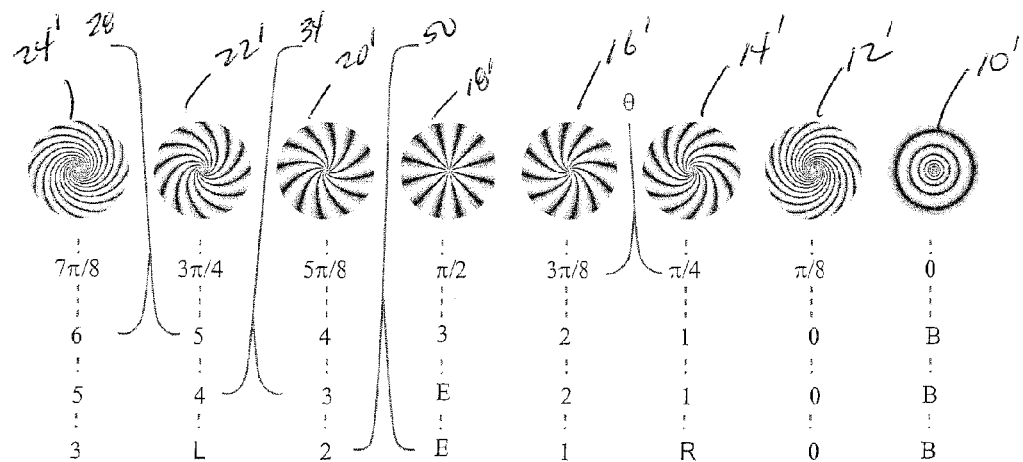
FIG. 3B is a representation of an exemplary optical machine-readable data code symbology according to the second embodiment of the present invention.
Figure 3C:
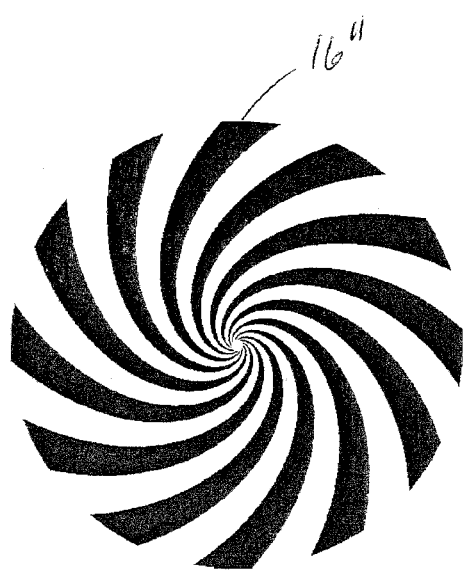
FIG. 3C is a representation of an exemplary optical machine-readable data code symbol according to a third embodiment of the present invention.
Figure 3A:
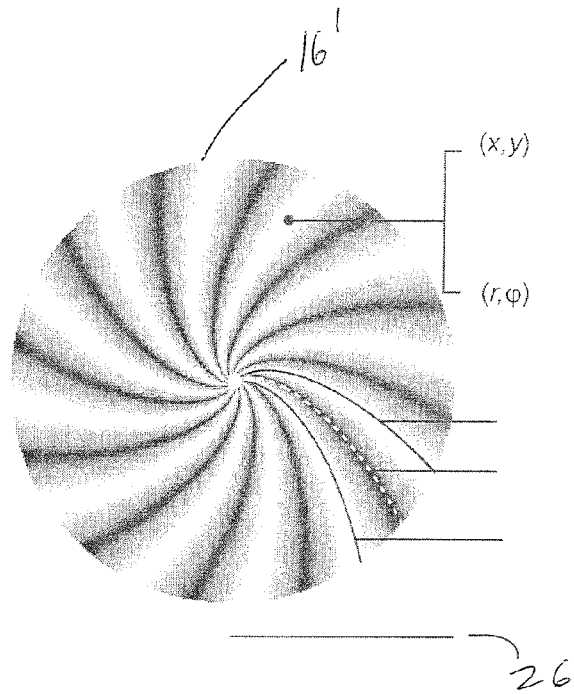
FIG. 3A is a representation of an exemplary optical machine-readable data code symbol according to a second embodiment of the present invention.
Figure 14A:
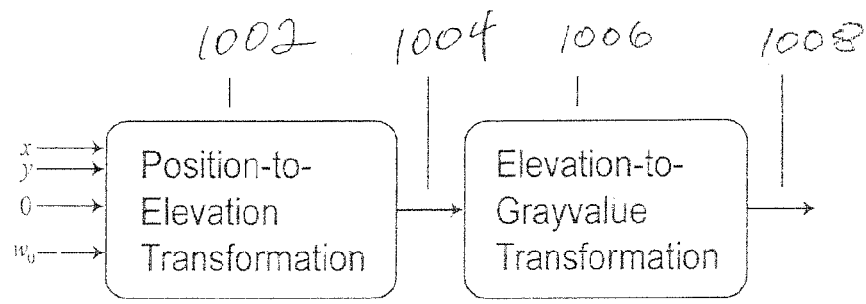
FIGS. 14A-14C are function block diagrams illustrating a methodology for position to gray value transformation according to a first embodiment of the present invention.
Figure 14B:
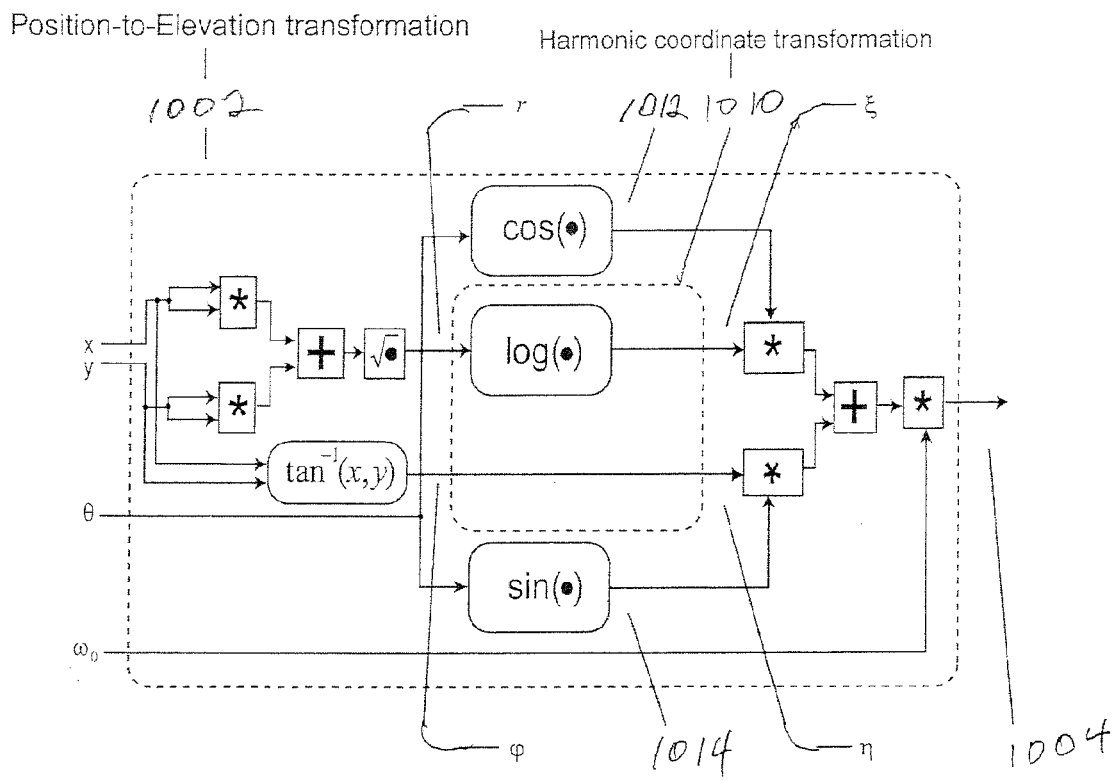
Figure 14C:
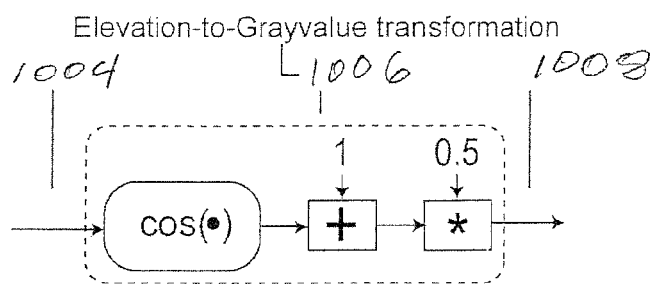

Turning now to FIGS. 3A and 3B, a second embodiment of an optical machine-readable data code symbology according to the invention is provided. The symbology includes eight symbols 10', 12', 14', 16', 18', 20', 22', and 24'. The symbols 12', 14', 16', 18', 20', 22' and 24' each comprises a plurality of spiral gray scale features (for example, twelve gray-scale features) radiating out from a central origin which can be considered in both Cartesian (x,y) and polar (r,φ) coordinate systems. The spiral gray scale features of the symbols can be viewed as a plurality of black lines flanked by a plurality gray lines of decreasing darkness ending in a plurality of white lines. The white lines and black lines can be thought of as peaks (ridges) and valleys with lines of increasing/decreasing "elevation" therebetween. FIGS. 14A-14C, described in detail below, illustrate a preferred methodology of deriving gray scaled values for the printed symbols of the second embodiment of FIGS. 3A and 3B. It will be appreciated that all of the spiral features, regardless of gray value, will satisfy Equation (1).

Figure 15A:
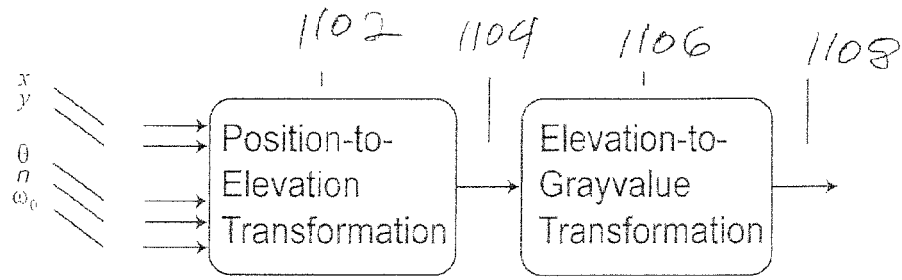
FIGS. 15A-15C are function block diagrams illustrating a methodology for position to gray value transformation (more specifically, producing halftone pixels) according to a second embodiment of the present invention.
Figure 15B:
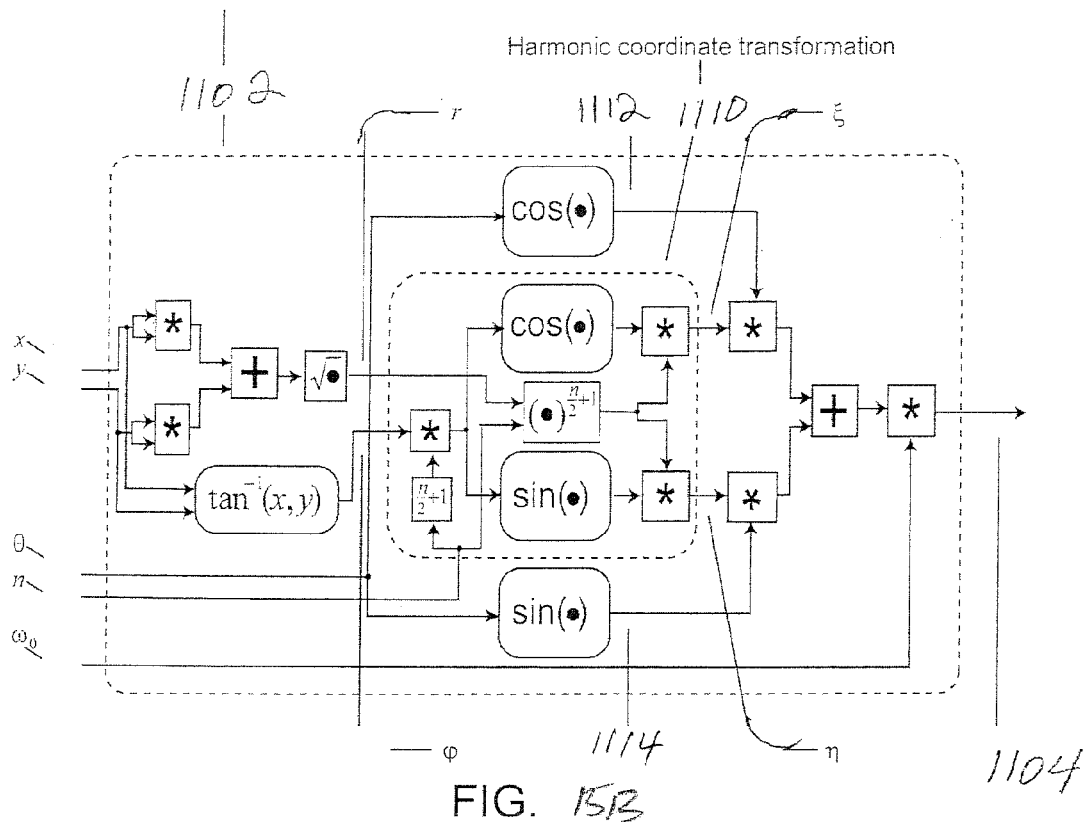
Figure 15C:
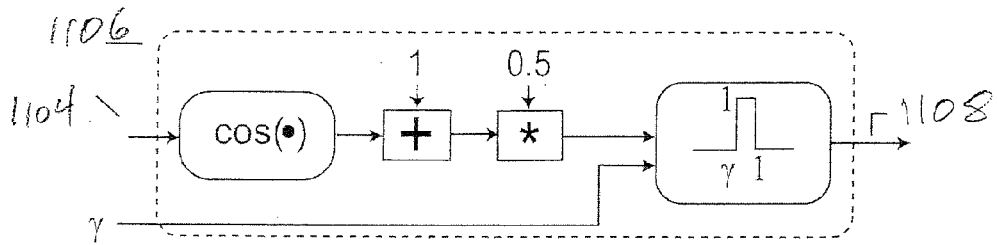

FIG. 3C illustrates a third embodiment of an optical machine-readable data code symbology according to the invention is provided. The symbology includes eight symbols (only one symbol 16" is shown) which are similar to those of the second embodiment of FIGS. 3A and 3B; however the spirals are defined by black spiral features (as compared to gray-scale features of the second embodiment) radiating out from the central origin of the symbol. FIGS. 15A-15C, described in detail below, illustrate a preferred methodology of deriving the black and white values for the printed symbols of the third embodiment of FIGS. 3C and 3B. It will be appreciated that all of the black or white spirals (transitions) features will satisfy Equation (1). Evidently, one can trace infinitely many spirals (not shown) within the regions such that all satisfy Equation (1). Taken in this sense even black or white regions "satisfy" Equation (1)

According to the present invention, the symbols of the first, second and third embodiments can be printed on a object or displayed on a display screen to visually convey information dictated by the underyling symbology. This is called "display-image" or "image" when it is evident from the context. The display-image can be combined with other display-images with margin-space or white-space between to yield a new display-image (i.e. a plurality of symbols comprising a single message). For each symbol to be produced, a set of parameters must be determined before the embodied writing method is invoked dynamically. Exemplary parameters are set forth in Table 1, below.

TABLE 1

| Parameter | Meaning |
| --- | --- |
| θ | The symbol angle, a value between 0 and π radians |
| L | The number of spiral features |
| $R_{max}$ | The maximum radius of the symbol, e.g. 256 pixels |
| $\omega_0$ | The maximal local frequency |
| $R_{min}$ | The minimum radius (the radius of the white origin) |
| S | The side size of an invisible square containing the symbol |
| M | The white space margin around the square containing the symbol |

With regard to L, this is the number of spiral lines or features that the user wants to have in the symbols. In the illustrated embodiment, L is set to 12 but other values would work equally well.

The maximum radius $R_{max}$ is the distance from the symbol center beyond which no gray-values will be placed in the display-image. The presently preferred embodiment sets the maximum radius at 256 pixels but other values can provide satisfactory results, depending on the application. The method described below will not calculate the gray values for the pixel, if it is outside of the maximum radius. The maximum radius 26 is shown as a horizontal bar at the bottom in FIG. 3A.

The maximal local frequency $\omega_0$ can be set manually, or by calculations according to application. According to one embodiment, $\omega_0$ is calculated as a function of θ. Where θ is different than zero radians, $\omega_0$ is set to 0.8π. Where θ=0 radians, $\omega_0$ is calculated by:

$$\omega_0 = 2\pi L/R_{max}^{(1/L)} \log(R_{max}) \qquad (2)$$

The minimum radius $R_{min}$ is the distance from the symbol center below which no gray-values are to be produced. It can be set manually, or by calculations. According to one embodiment $R_{min}$ is calculated as a function of θ. Where θ=0 radians, $R_{min}$ is set to $R_{max}^{(1/L)}$. For θ different than zero, $R_{min}$ is calculated by:

$$R_{min} = L/(\omega_0 \sin\theta) \qquad (3)$$

The purpose of the minimum radius $R_{min}$ is to assure that the symbol gray values will not appear cluttered around the symbol center. Values other than those suggested above can give satisfactory results. The background for the symbol in the area between $R_{min}$, and $R_{max}$ should be white, although other contrasting backgrounds relative to the spiral features can be used.

The area of the display-image in which a symbol can be placed can be set manually. Alternatively, it can be calculated by setting it to twice the maximum radius, rounded off to the closest pixel integer value. In one embodiment, the area of display image is 512×512 pixels. This size prints well on as large as approximately 20×20 cm (7.9 inches square) which fits an A4 sized paper. For larger physical sizes, $R_{max}$ can be increased to avoid pixilation (the block-effect). On currently available mass-consumer quality printers and PC combinations, area display-images of 512 by 512 pixels, with eight symbols in the alphabet, at resolutions 600 dots per inch, print out well-discernable and as rapidly as in a few seconds.

According to one embodiment, the total "white" space margin surrounding a symbol is approximately ten percent of pixel dimension of the display image area (i.e., 50 pixels for the display-image of 512 by 512 pixels). Although "white" is used in the presently preferred embodiments, the gray value or the color of the pixels in the margin has no effect on the success of the application, as long as it stays constant in the margins. It is convenient to use the same amount of margin horizontally and vertically.

The present embodiment maps the symbol angles of its "alphabet" as shown in FIG. 1 to alphanumeric characters for convenience, and conformance to the practice of information theory science. In particular, according to one embodiment shown in the row labeled 28 of FIG. 1, the bulls-eye symbol 10 (whose symbol angle=0 radians) is mapped to the letter 'B' to signify 'Beginning'. The other seven symbols 12, 14, 16, 18, 20, 22 and 24 are mapped to integers from zero through six. Both the letter 'B' and the seven digit symbols are members of the American Standard Code for Information Interchange, ASCII. Consequently, every word of this embodiment represents a combination of eight characters found in the ASCII set. In this example, there are forty-nine different words that can be produced by using three symbols if one of the symbols must be 'B'. More symbols can be used to spell out more or larger words. However, for the purpose of the first example, described below with reference to FIG. 4, forty-nine words is sufficient.

Figure 4:
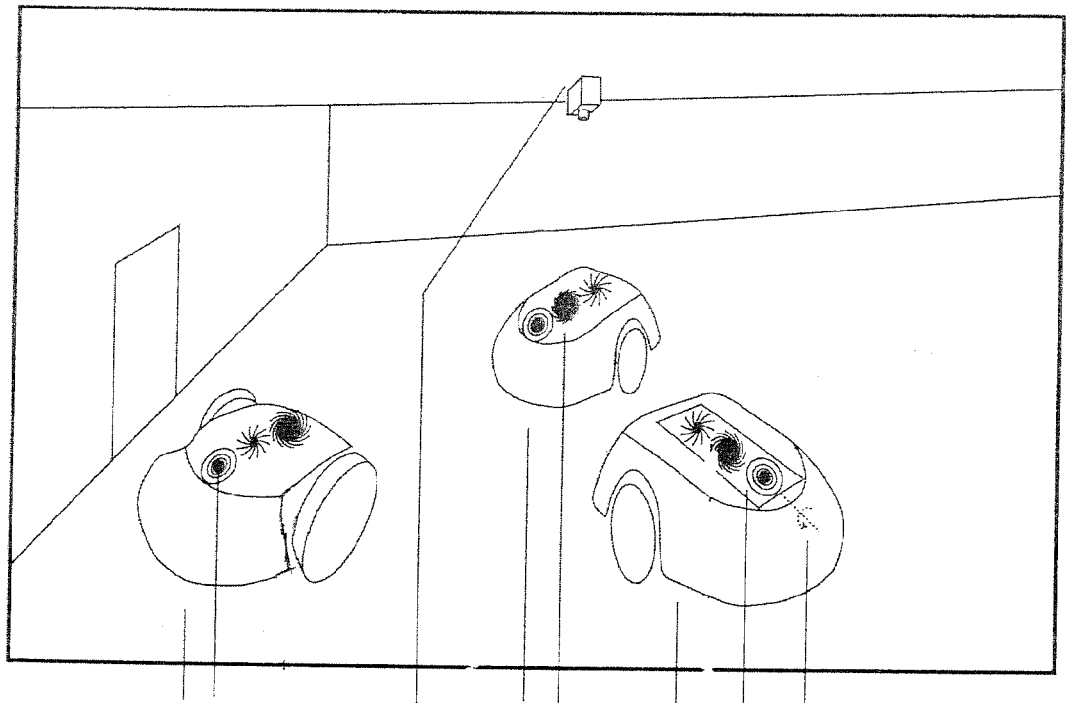
FIG. 4 is a schematic illustration of a first exemplary application of the invention.

The display-image representing a word will be manually printed on adhesive papers of A4 or letter size using a commonly available display software on PCs such as Windows Picture and Fax Viewer, from Microsoft Inc, Redmond, Wash., USA on a commonly available printer, such as HP Officejet 6100 series from HP Corporation, Palo Alto, Calif. The (printed) display-image is then fixed on an object (FIG. 4). The physical place where the symbol center is fixed at, is called display-point. The display-point of a whole word is the display-point of a predetermined symbol position in the word, here the "B"-symbol.

Figure 5A:
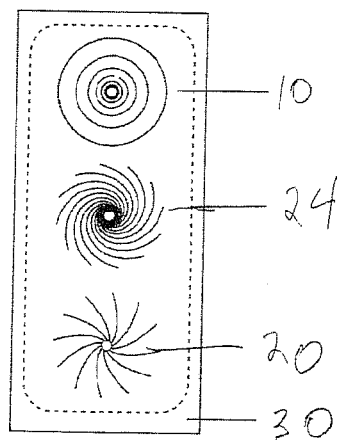
FIG. 5A is a representation of a one dimensional matrix utilizing the symbology of the first embodiment.
Figure 5B:
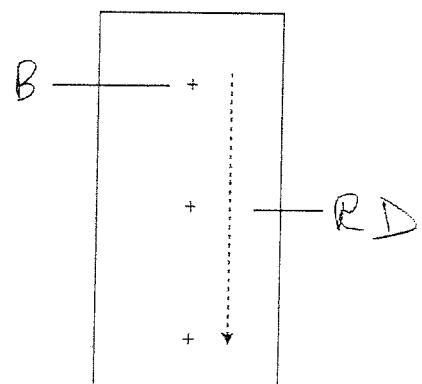
FIG. 5B is a representation of the reading direction for the matrix of FIG. 5A.

In this embodiment, the method produces first display-images of three symbols with size 512 by 512 pixels each, then it combines them into a larger display-image with margins as shown in FIG. 5A. The physical size of the surface a word is printed on is approximately 5×15 cm including the uniform margins around symbols. The overall size of each symbol is 612×612 pixels (including margin) printed at 300 dpi. As described in more detail below, the display images are detected and decoded by locating the B symbol as seen in FIG. 5B and reading in the direction RD away from the B symbol as shown.

Alternatively, the symbol families and words formed by matrices of symbols as described herein can be written on adhesive paper using consumer grade equipment, then adhering the paper to an object to be identified. Alternatively, using commercial grade equipment, the symbols can be written directly on an object to be identified. Symbols can also be created using various molding or photographic techniques or can be displayed ephemerally on an electronic or electromechanical display. Also, the symbols can be printed as line art, half-tone images or grayscale using conventional methods.

A first illustrative method for machine-based detection and decoding of the symbologies described herein is described in conjunction with FIG. 4 illustrating factory floor robots 40, 42, 44 observed by video camera 46. The robots are employed to keep the factory floor clean. Robot 40 is equipped with a vacuum cleaner (not shown). Robot 42 is equipped with a floor polishing tool (not shown) and the robot 44 is equipped with a defect detector (not shown). Each robot is provided with a visible message comprising a 3×1 matrix of symbols from the first symbol family (FIG. 1) arranged as shown in FIG. 5A. A command center (not shown) determines the identity and location of each robot by viewing with the video camera 46. When the floor inspecting robot 44 detects a defect it stops moving and the command center determines the location of the robot 44. The robot 44 actually has two messages on opposite sides of a rotatable plate 48 and chooses which message to display by rotating the plate about the axis 48a. One message indicates "no defect here", the other "defect detected here".

The obstacles hindering the movement of the robots (not-shown in the figure) are assumed to be known to the command center, e.g. via an obstacle map. Furthermore, the method for machine-based symbol detection and decoding can be implemented either as hardware or in software that processes the images captured by the camera 46. These images are referred to as observer-images here because they contain observations of display-images. Note that display-images are images containing symbols that are made visible on physical points (here they are printed on paper fixed on robots).

In the illustrative embodiment, the "B"-symbol is specially treated in that it only occurs as the first symbol (in the reading direction), and no symbol other than the "B"-symbol can occur in the first symbol position. This choice is referred to as the special-symbol policy as it spells out which symbols are allowed where. The reading direction is determined if the first symbol position is known due to the simple geometry of the symbol positions in a word. For example the words attached on the robots 40, 42, 44 in FIG. 4 have the corresponding ASCII-words 'B26', 'B02', and 'B62', if the symbol angles are ordered in the reading direction away from the B symbol.

The defect detecting robot 44 currently displays 'B62' in FIG. 4, but it has another ASCII-word, 'B64', in its custody, hidden on the other side of the rotatable plate 48. 'B64' is shown FIG. 5A to illustrate the words of this embodiment.

It is worth emphasizing that the information is physically encoded in the symbol angles of the spiral lines of each symbol. In other words, the encoded information is buried everywhere within a symbol and the transitions from black to white or vice-versa have no significance to the meaning of the information more than to make the reading more robust against disturbances. This is in diametrical opposition to the conventional bar-codes, which encode information in the transitions between black and white shades.

A word can be seen as a specific value of a variable that holds an ASCII code or its corresponding integer code. The amount of information that a variable can hold is frequently expressed as the bit-length of the variable, which is defined as $\log(N_{ID})/\log(2)$, where $N_{ID}$ is the number of different words the variable can hold. The bit-length of the variable representing the different words of the present embodiment is thus 5.61, without robot location and orientation information. Evidently, even this information is important for the considered application. The camera image size in this embodiment is 800×600 pixels, yielding 9.64 bits for the x-coordinate and 9.23 bits for the y-coordinate totaling to 18.9 bits to hold a symbol location. However we need two symbol locations to express location and orientation information of a robot yielding 37.7 bits. Thus every time the embodied reading method decodes a word, useful information worth of at least 43.4 (i.e. 44 bar code lines!) is transmitted to the command-centre using the same reading technique for both location/orientation and identity information.

Representing information with (dimensionless) symbol angles is thus an important difference between the invention and the prior art. In the latter, the information is represented in transitions of reflectance, to be precise in (metric) lengths/sizes of regions having equal reflectance properties before and after the transitions.

The machine-based symbol detection and decoding operations as described herein are preferably realized in software executing on a personal computer, PC, (not shown). The PC communicates directly with the camera via its Universal Serial Bus port, USB, and a cable connection. The observer-image does not need to be the entire image delivered by the camera to the embodied methodology. Most frequently, it will be a sub-part of it (also called region of interest in image processing), to improve the detection efficiency tremendously both in computational speed and to avoid false detections or false rejections. In this embodiment, the observer-image is such a region of interest having a fixed size (for example, 120×120 pixels), which is selected to enable processing a single word in an observer-image most of the time. FIG. 9 shows an exemplary region of interest labeled 511.

The command center invokes machine-based symbol detection and decoding operations by specifying the coordinates of the observer-image, which are the coordinates of the upper left corner, in the full image delivered by the camera. Accordingly, there are three observer-images, one for each robot. The coordinates of the three observer-images are initially determined by requesting word readings in a series of 120×120 pixel squares covering the full camera image with fifty percent overlap (horizontally and vertically). The three squares containing the words fixed on the robots are the initial observer-images the coordinates of which are constantly updated by the command center by the output of the word reading. This is because in the time that passes between two readings the robot in each command center moves but remains in the rectangle. The command center updates the coordinates of the observer-images accordingly.

In the following description, the term "image" or "acquired image", in a context of an embodied reading method, means the observer-image which is a subpart of an image delivered by a camera.

The camera used for this embodiment is a commonly available digital video camera from Axis Communication AB, Lund, Sweden, (Axis 223M). The focal length is fixed at 4 mm. The camera delivers digital images of the floor with 600 rows by 800 columns resolution at 25 frames per second. It is a color camera but the embodied reading method uses only gray-values, i.e. the average of red, green and blue pixels in the corresponding color channels of the camera are used to represent the acquired image. Accordingly, even a black and white video-camera, or other imaging equipment, with other spatial and temporal resolutions will give satisfactory results, depending on the size of symbols and the maximum velocity of them relative to the camera.

Before the reading method is made operational, standard issues are addressed to the extent it is possible to eliminate problems at the source (such as non-uniform illumination of the scene, and systematic artificial distortion such as image distortions caused by lens imperfection. Both issues are assumed to have been addressed according to the state of the art knowledge. Non-uniform illumination is preferably addressed by making sure that there is sufficient light in the scene as viewed by the camera, by adequate placement of the camera relative the light source(s), etc. In many cameras noticeable lens distortion exists but is not too severe to hinder satisfactory operation. However, when it is severe an appropriate corrective geometric transformation is applied to every acquired image before the embodied reading method processes them. Such transformations are found by calibrating the imaging equipment, as described in the technical paper of J. Heikkilä and O. Silven, "Calibration procedure for short focal length off-the-shelf CCD cameras", International Conf. on Pattern Recognition, ICPR-96, IEEE Computer Society, pp. 166-170, (1996), the complete disclosure of which is herein incorporated by reference in its entirety.

Figure 6:
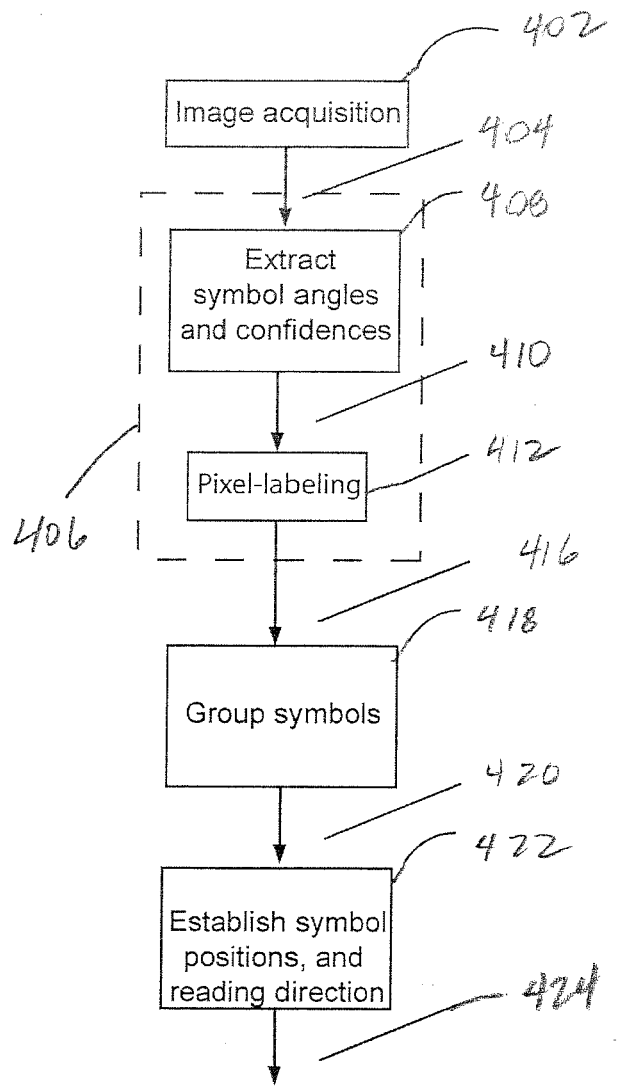
FIG. 6 is a flow chart illustrating a first embodiment of a method for machine-based reading and decoding of a matrix of symbols utilizing any one of the symbologies described herein.

As shown in FIG. 6, the machine-based symbol detection and decoding operations includes an image acquisition step 400 that communicates with the camera to obtain an observer image of the floor (FIG. 4) using communication subroutines delivered by the camera manufacturer. Such subroutines, called DLL's on the Windows operative system from Microsoft Corporation, Redmond, Wash., USA, are also available for many camera brands in the software libraries of major operating systems currently running on PCs including the one cited. The image acquisition step calls such a communication subroutine to output (404) a matrix of integers representing the gray values of image pixels of the observer image.

In module 406, the observer image output in 404 is processed to extract a list of symbols therein. This module takes in an observer-image and delivers properties of symbols in a mixture of real values and integers, for every detected symbol. In the preferred embodiment, module 406 includes a Generalized Structure Tensor (GST) method 406 that utilizes two complex valued filters to extract symbol angles and confidences. The filters and the image processing steps of the GST method 406 must be adapted to the symbol family which will be used as they will appear in observer-images. In particular, the symbol family to be detected is determined by the second of the two filters. Thus, to be detected, a symbol must have an extension in observer-images such that it fits a size range determined by the size of the second complex filter although even the first filter influences the range but to a minor extent. In turn, these filters are generated from two Gaussian functions each with its own standard deviation $\sigma_1$, and $\sigma_2$, respectively, determining the sizes of the filters.

The present embodiment uses a standard deviation of $\sigma_1$=0.75 and $\sigma_2$=6.4, which gave satisfactory localization and identification of symbols having extensions of approximately twelve to eighteen pixels in diameter in the observer-image. The GST method and its filters are described in Chapter 11 of the text book of J. Bigun, "Vision with Direction" Springer, Heidelberg, (2006), herein incorporated by reference in its entirety.

In particular, this embodiment utilizes expression 11.97 (reproduced below) of the text book, to obtain the filters.

$$\Gamma^{\{p,\sigma^2\}}(x, y) = (D_x + iD_y)^p \frac{1}{2\pi\sigma^2} e^{-\frac{x^2+y^2}{2\sigma^2}} \quad (11.97)$$

The expression $(D_x+iD_y)$ is a derivation operator that acts on the expression appearing to its right where i is the complex number corresponding to $\sqrt{-1}$ In the expression we have $(D_x+iD_y)^p$ where p is an integer corresponding to the symmetry order n. It means that the basic operator $(D_x+iD_y)$ is applied p times. If p is negative the operator $(D_x-iD_y)$ is applied (-p times) instead. We need to generate two filters, one p=1, and $\sigma$=0.75 yielding $$C_1(x+iy)\exp\left(-\frac{x^2+y^2}{2\sigma_1^2}\right)$$

and p=-2, and $\sigma_2$=6.4 yielding $$C_2(x-iy)^2\exp\left(-\frac{x^2+y^2}{2\sigma_2^2}\right)$$

where $C_1$ and $C_2$ are two non-essential constants for image processing because the resulting filter coefficients are normalized with the sum of the filter (magnitudes of) coefficients. As will be explained later, it is the choice p=-2 which makes the non-linear image processing in which the filters are used act as symbol angle decoder for spiral patterns.

These two complex filters are used in the following non-linear image processing, expression of (11.105 reproduced below) of the text book, $$I_{20}(|F(\omega_\xi,\omega_\eta)|^2)=C_m\Gamma_k^{*\{n,\sigma_2^2\}}*(\Gamma_k^{\{1,\sigma_2^2\}}*f_k)^2 \quad (11.105)$$

$$I_{11}(|F(\omega_\xi,\omega_\eta)|^2)=C_n|\Gamma_k^{*\{n,\sigma_2^2\}}|*|\Gamma_k^{\{1,\sigma_1^2\}}*f_k|^2 \quad (11.106)$$

where $\Gamma^{*\{n,\sigma_2^2\}}=(\Gamma^{\{n\sigma_2^2\}})^*$.

appearing on the right hand side (of 11.105). Here, we used n=−2 and standard deviations as mentioned above.

The term $f_k$ represents the observer image pixel value at an arbitrary pixel (the location of which is book-kept with the single integer index, k). The term $\Gamma_k^{\{1,\sigma_1^2\}}$ is the first complex filter, (given above) sampled or discretized at the same pixel locations as the observer-image pixels with filter origin being the current pixel location (book-kept with k), and $\Gamma^{*}{}_k^{\{-2,\sigma_2^2\}}$ is the complex conjugate of discretized second complex (given above) filter. Complex conjugation is represented by the star * in the exponent and amounts to replacing i in the second filter with −i. The factor $C_n$ a non-essential constant because we normalize the results. The star * represents discrete convolution (when it is not in the exponent). The operations represent convolution with the first filter of the observer-image, then squaring it pixel-wise according to squaring rule of complex numbers, and then convolution with the second filter.

The expression 11.106 can also be used as an alternative normalization of (11.105) by division in case we have large observer-images with significant light intensity variations. In the equation, the operation |.| represents (complex pixel) magnitude.

In both expressions (11.105 and 11.106), the left sides represent names as a help for the user as to what is going on the right hand side. The names are called $I_{20},I_{11}$ with the indices telling that they take the respective complex moments (20, and 11) of the local power spectrum around the current pixel (represented as $|F(\omega_\xi,\omega_\eta)|^2$); however, in the $\xi, \eta$ coordinates (in this embodiment $\xi,\eta$ represent the log-polar coordinates).

The result is a complex image called an assessment image from which symbol centers and symbol angles are extracted. The assessment image is a single image, which has the same size as the observer-image, where the pixel values are complex valued. The magnitude of the complex values represent the confidence in the pixel position being a symbol center, whereas the argument (or phase) represents an estimate of the symbol angle.

The complex pixel values of the assessment image are normalized by the largest magnitude appearing in the assessment image before they are output as the result 410 of step 408. We chose this normalization, because we use region of interests that are small (120×120 pixels) wherein the light variations are not large, compared to full camera images. The normalization is applied to the assessment image consisting of dividing complex pixel values with the maximum magnitude (of complex pixels) occurring in the assessment image. It is also possible to normalize it by calculating a normalization value for each pixel separately. It is plausible to use $I_{11}$, (described in the mentioned text book and summarized above) as normalization value calculated for every pixel if the observer-image contains significant illumination variations, e.g. when using full camera images having illumination variations. Evidently, as said before, the best is to avoid problems of significant illumination variations, at the source, namely by having sufficient light Prior to normalization, the complex assessment image does not yet contain crisply marked symbol positions. This is because both confidence and symbol angle are estimated for every pixel position jointly in a contiguous manner, i.e. every pixel position is given a confidence, between zero and one, for it being the center of a spiral 1 (FIG. 3), at the same time as an estimation of the double of the symbol angle θ (FIG. 2) for the reasons described as follows. The delivered angle per pixel is thus twice the angle of the symbol angle which makes it 2π periodic i.e. it is unique between 0 and 2 π radians as opposed to the symbol angle. For example the symbol angles π/4 and 5π/4 are conceptually two different angles but they correspond to the same symbol. Multiplying them by two yields π/2 and 5π/2 and makes them equivalent conceptually because the result is the same angle (on a circle) all the while they represent the same symbol.

The delivered (double) symbol angle is also non-quantized, i.e. the angle may fall between the "official" (eight) bins of the symbol family. This is because the method is able to estimate the symbol angles at any degree of precision (not just eight levels) provided that the original image also has the images of symbols in the corresponding high quality (in resolution and pixel depth). To make it an "official" symbol angle, i.e. one of the eight angles in FIG. 1, it needs to be quantized in a later step when it is known which pixels are retained as symbol positions.

A complex pixel value is also called assessment here because the value contains data representing a judgment on the likelihood of the corresponding pixel position to represent a symbol from the used symbol family, as well as an estimate of the symbol (double) angle (non-quantized). If the confidence is high then the delivered angle (argument) points out the optimal estimate of the symbol angle at the same time. Conversely, if the confidence is low, then that position is not likely to be a symbol center and neither makes the delivered symbol angle sense even if it is the best fitting angle because the error in the fitting is too large (as reflected by the confidence value).

The output 410 of this step is thus a complex image where the pixels are complex valued (representing assessments) in addition to the symmetry order (an integer that identifies the symbol family). As will be explained in detail below with reference to other embodiments, symbols from different families can be mixed in the same message.

The subsequent step 412 applies a pixel-labeling to the assessment image 410 where the complex values of each pixel are labeled either as "background" or "symbol position". In the present embodiment, this is done by first thresholding the confidence values. Assessments having magnitudes less than a threshold T are put to zero, while those that have higher confidence remain untouched. The threshold T is a prerequisite parameter derived from testing. In the preferred embodiment, T is in the range of 0.4 to 0.98 depending on the quality of observer-images. The zero valued pixels, mark locations that will not be considered as being symbol positions occupied by members of the symbol family since their assessments have suggested low confidence for them to be symbol centers. The threshold sets the non-significant magnitude responses (confidences) to zero to be able to concentrate on the small regions surviving the threshold, which contain significant confidences, and to reduce them to single points (symbol centers) with subsequent computations.

After thresholding, the assessment image includes a majority of zero valued pixels together with blobs (or spots) with small radii containing complex pixels with large magnitudes. These spots are called blobs because they appear as bright spots when the magnitudes of the complex image is visualized as an image with gray-value pixels. The center of a symbol will be found near the center of a blob. These blobs contain complex valued pixels (assessments) which are larger than a single pixel because the filtering of method 408 causes a widening of the extent of the confidence values, which mark a symbol presence by being high. This is in turn caused by the same mathematical phenomenon underlying the Heisenberg uncertainty in quantum mechanics, stipulating that it is not possible to measure the frequency and the position of a particle at infinite accuracy, in both position and frequency. The filtering of method 408 attempts to measure both locality and a frequency dependent property (wave orientation), explaining the blobs. Instead of a sharp spike marking a symbol center, a widened blob is obtained.

A Blob is reduced to single pixel (spike) by a series of estimations identifying the centroid of the respective blob. This is done by using the fact that magnitudes of pixels are higher at or near the centroids, and by using predetermined knowledge on average blob diameter. The average blob diameter is roughly twice the standard deviation $2\sigma_2$ of the complex filter of method 408 specific to the spiral symbol family. Centroid filters of that size (here 13×13 pixels) are used to calculate the centroids of each blob. The centroid calculation is a known image processing technique and is described in e.g. the text book of J. C. Russ "Image Processing Handbook: The Second Edition", CRC Press, Boca Raton, (1995), the complete disclosure of which is herein incorporated by reference in its entirety.

The centroid calculation is applied to magnitude values of blobs (of the assessment image). The centroid coordinates are fractional in pixel locations in that they will likely fall between integer valued pixel coordinates. A complex value to be associated with the fractional centroid coordinates, i.e. the assessment for the entire blob, is obtained from the neighboring complex values by copying the complex value of the closest pixel position (with integer coordinates).

Alternatively, the centroid of a blob can be derived by applying the non-maximum suppression technique to the magnitude values (of the assessment image) thresholded as above. Pixels that are not maximum within a predefined neighborhood of a pixel (i.e., 13×13 pixels in this example) are set to zero if the maximum is the current pixel (the center of the neighborhood). If the maximum in the neighborhood is not the current pixel, then every pixel is set to zero in the neighborhood (including the center). The technique yields the (integer) coordinates of a single pixel representing the blob center, and is described in the technical paper of J. Canny "A computational approach to edge detection", IEEE Trans. Pattern Analysis and Machine Intelligence, vol. 8, pp. 679-714 (1986), the complete disclosure of which is herein incorporated by reference in its entirety. The resulting blob centers can also be refined by calculating the centroids in the neighborhoods (13×13 pixels) of the found centers. A complex value is associated with the (final) blob centers by copying the complex value of the closest pixel position (with integer coordinates).

Accordingly, the output 416 of step 412 is a list of five-tuple data, each representing numerical values associated with a symbol. These are, for each symbol, the symmetry order (an integer identifying the symbol family), the magnitude of the complex value (representing the confidence in symbol position), the argument of the complex value (representing the double of symbol non-quantized angle), and the x and y coordinates of the origin of the symbol (derived from the centroid of the blob).

The next step 418 groups the symbols identified by the output 416 of step 412. It extracts the candidates that are most likely to be the symbols that constitute a word from the list of candidates 416. In the present embodiment, this is achieved as follows. According to the predetermined specification, the "B"-symbol will not occur anywhere else than the first position in the reading direction. The arguments of the stored complex values (assessments) in the candidate list are delivered as twice the symbol angles θ (FIG. 2).

Accordingly, quantized symbol angles are put into double angle representation by multiplying them by two when representing them numerically throughout the processing. At this step the "B"-symbols are identified by comparing the nominal (double) symbol angle (which happens to be zero), with the values delivered by the list of symbols 416. If the "difference" is less than the angle quantization step, i.e. here $\pi/8$ radians, then the delivered symbol angle is identified as "B"-symbol. The symbol angle in the list is quantized to the double of the symbol angle corresponding to "B"-symbol (in radians). The difference comparison of angles is done on the unit ring because $2\pi$ and zero radians are equivalent angles. Accordingly, for example, both of the differences $\pi/1000$ and $2\pi-\pi/1000$ are close to zero radians, even if the latter is (numerically) a large value.

The remaining candidate positions are logically adhered to or assigned to the closest of "B"-symbols resulting in a grouped listing of symbol candidates where each "B"-symbol is listed or grouped together with its adherents. If the number of symbols adherent to a "B"-symbol is different than expected, e.g. two rather than three, then this group of symbols is marked with the "anomaly" value (numerically zero) in the "geometry-confidence" variable introduced at this step 418 that will be tagging the data stream of each word. If the number of adherent symbols conforms to the expected number of symbols the "geometry-confidence" variable is set to "normal" value (numerically one). Euclidean metrics and pixels as distance unit are used in distance calculations. The quantization of other symbol's angles will take place in the next step for convenience. The reading direction of the adherents of a "B"-symbol is not established yet.

The output 420 of the step 418 comprises a list of numerical values representing groups of symbols that are word candidates. The first value is an integer representing the number of found words in the image, followed by the data stream of each word, one after the other. The data stream of a word consists of the geometry-confidence value, the number of adherent symbols, followed by as many symbol data in the order the adherents are found. The symbol data consists of a five-tuple data representing symmetry order, confidence, double of symbol angle, x-coordinate of position, y-coordinate of position.

In the next step 422, the reading direction is established among the adherents of "normal" word candidates. This is to avoid further processing of the groups of symbols that do not contain the expected number of symbols. The symbols in a word candidate, i.e. the adherents of a "B"-symbol, are not necessarily to be found geometrically "beneath" "B"-symbol in the observer-image because robots can rotate. The "B"-symbol is the first symbol in the reading direction in this embodiment. The adherent that is farthest away from the "B"-symbol will be the third symbol.

A candidate for the second symbol is the remaining symbol which is closest to the mid-point of the line-segment between the first and third symbol positions. Due to noise in images and the fact that centroids can be located between pixels, geometry conformance of the second symbol candidate should be done within a tolerance distance from the mid-point. The tolerance distance is calculated here as the five percent of the line-segment joining the first symbol and the (calculated) mid-point. Otherwise, the word candidate is flagged with "anomaly". If the remaining symbol passes the test, "geometry-confidence" remains "normal". Subsequently, the symbol angles of the adherents are quantized by choosing the closest symbol in the symbol family. The closest symbol within the family is the one that has a symbol (double) angle differing from that of the candidate symbol with the angle quantization step (here $\pi/8$) or less. Also, (upon "normal" flag), the symbol data are reordered to reflect the reading direction. The procedure is repeated for all word candidates flagged as "normal".

The output 424 comprises a list of numerical values representing identified and located symbols ordered in the reading direction. In this embodiment, the first value is an integer representing the number of found words in the acquired image, followed by the data stream of each word one after the other. The data stream of a word consists of the geometry-confidence value, the number of adherent symbols, followed by as many symbol data in the reading order (in case of "anomaly" in the order they are found). The symbol data consists of a five-tuple data representing symmetry order, confidence, double of symbol angle, and the x and y-coordinate of origin of the symbol.

The words are now fully decoded in terms of quantized symbol angles drawn from the embodied spiral family as a response to the request of the command-centre asking to decode one or several words in the observer-image. However, quantized symbol identities are easily mapped to ascii equivalents by a table look-up. This is not included in the embodiment and left to command-centre for larger flexibility. Evidently, translation to a data-stream of ascii characters can also be achieved by the current step, so that the output 424 comprises ascii characters.

The command-centre then knows the exact location, and the exact orientation of each robot in addition to the identity of each robot at times that it chooses. This information allows the command-centre to use the position and orientation of each robot in a feedback-control of steering the robot traction-wheels. The vision-based feedback is an enabling technique to control the traction-wheels precisely, allowing to achieve mission-specific floor inspecting/cleaning.

The command center can demand evaluation of the acquired image as often as it deems necessary, typically periodically, e.g. such as 5 times a second, and according to its mission. The embodied reading method times together with the feedback-control calculation times allow using the robots up to the maximum speed dictated by that the trajectory of the robots must be sampled at the fastest pace the calculations allow for.

Figure 7:
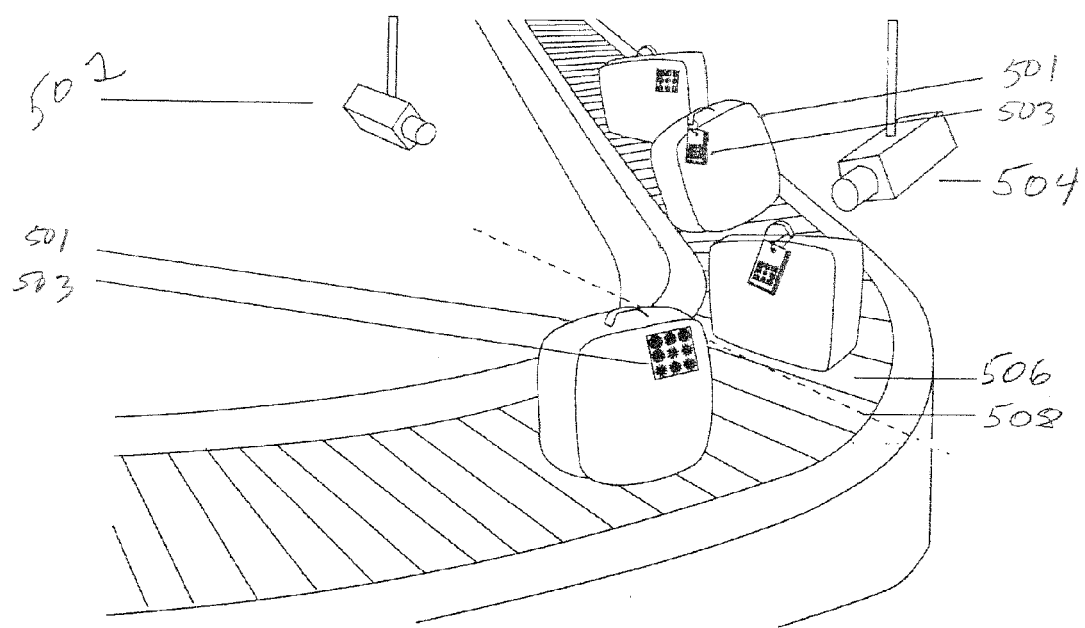
FIG. 7 is a schematic illustration of a second exemplary application of the invention.

A second illustrative method for machine-based detection and decoding of the symbologies described herein is described in conjunction with FIG. 7 illustrating a baggage tracking application where bags 501 carry printed labels 503. As in the embodiment of FIG. 4, there is a command center with various capabilities with which the elements of the embodiment interact. The application serves as a context where the capabilities of the symbologies of the present invention as well as the machine-based detection and decoding method of such symbologies serves as an enabling technology.

A label 503 is attached to each bag 501. The labels 503 can be fixed to the bags 501 directly or by hanging therefrom. As best shown in FIG. 8A, the labels 503 include symbol surfaces 32 that display symbols are on a square grid (3×3 matrix). The symbols are selected from the symbol family of FIG. 1 such that a label contains a word which represents the identity information of the bag as shown in FIG. 8A. A bag 501 can have several labels 501, to track it from multiple views, but the labels display the same word representing baggage identity. There are nine symbols printed on the symbol surface 32 constituting a word. The geometry of symbol positions is two dimensional in that symbols are placed on a 3×3 square grid with a reading direction being that of english text (RD in FIG. 8B). The physical dimension of the symbol surface including the margins is in this example 15×15 cm.

There are nine symbols in each word in this embodiment and two symbols are used to mark the "Beginning" and the "End" of positions in a word, as illustrated by the symbols representing the characters "B" and "E" (symbols 10 and 18 in FIG. 8A). Accordingly, there are seven symbols reserved for the baggage identity and two separate symbols are reserved for position markers.

The overall goal of the application is to track each bag 501 such that the location of every bag is known. This allows tracking bags in large areas equipped with a network of cameras. The command center receives word and symbol position (pixels) information associated with each bag by means of the embodied reading and writing method of a variable.

In this application, there are several imaging devices (video cameras), of which only two 502, 504 are shown in FIG. 7 observing the scene, each responsible for a specific region of the observation space, comprising the conveyor belt 506 and its vicinity. Each camera is connected to its own PC via cable (e.g. USB). Each PC is executing software that embodies a method for machine-based detection and decoding of symbologies as described herein. Alternatively, a more powerful hardware with multiple Central Processing Units, (CPUs), which can execute multiple instances of the reading method concurrently gives satisfactory results as well.

The command center, which is preferably embodied in software, is able to initiate an instance of a reading method associated with a camera and obtain the result of this reading by accessing predefined memory spaces. For example, the command center places a request for reading by modifying the content of a predefined memory cell associated with one camera 502 and its reading method to a predefined value. The concerned reading method of the camera discovers that its memory cell has been changed to a predefined value and starts its processing by using the most recent image of the camera 502, and eventually delivers its results to a predefined memory area with appropriate time-stamp values. Because the command center is responsible for hand-over of a bag from one camera view to the next, it is also responsible for camera installations to fit that purpose, i.e. there is appropriate overlap of camera views. The latter can be achieved by observing simultaneous presence of a bag in a border area e.g. defined as pixels in a certain strip around a predetermined line 508. Hand-over can thus be done with image coordinates of symbol positions of a word (the bag identity) being observed in two neighboring cameras in predefined image regions.

However, hand-over can even be done by using space coordinates of the symbols which can be calculated from the image-coordinates using known computer-vision techniques.

As in the embodiment of FIG. 4, the command center applies the region of interest technique to limit the tracked regions to sub-images of the image, delivered by the cameras. That is, it requests reading of words in these sub-images from the reading method embodiment and updates the coordinates of them by means of the delivered symbol positions. As before these sub-images are called the observer-images.

In this embodiment, nine symbols are used in a 3×3 matrix rather than three symbols in a 3×1 matrix (first embodiment). Thus, the reading routine will be different. In addition, in this embodiment, an ending symbol E is used in addition to the beginning symbol B. In the first embodiment, the message ended with the third symbol. In this embodiment, the message ends with the eighth symbol, the ninth being the symbol E.

Figure 10:
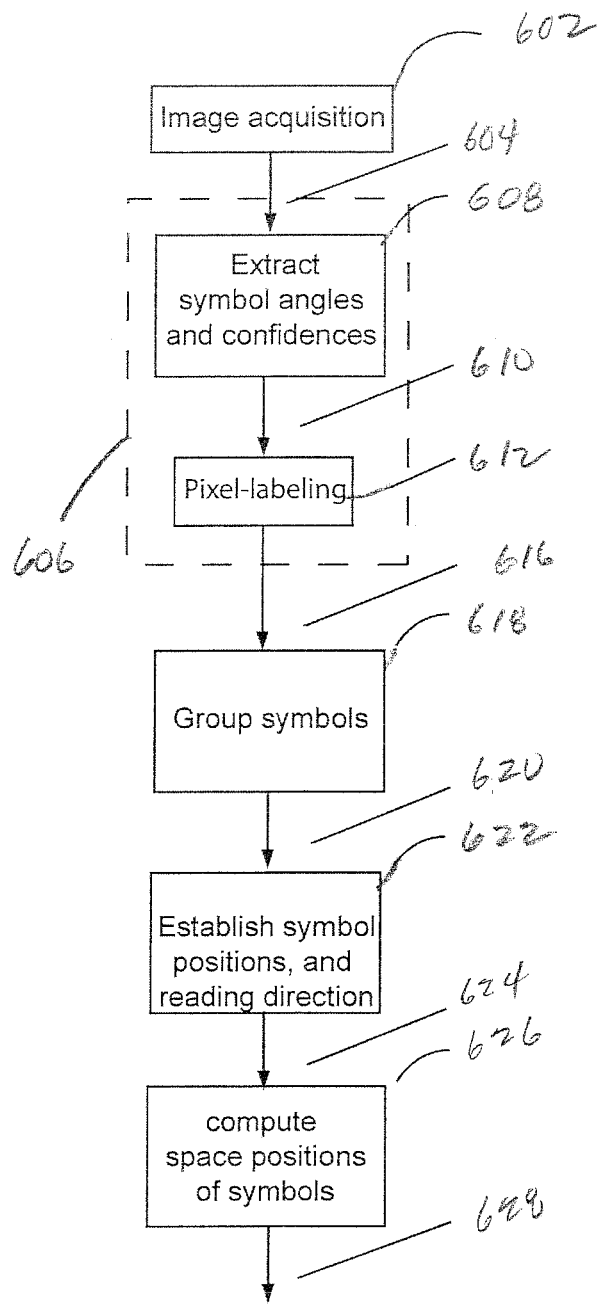
FIG. 10 is a flow chart illustrating a second embodiment of a method for machine-based reading and decoding of a matrix of symbols utilizing any one of the symbologies described herein, which is particularly suited for use in the application of FIG. 7.

As shown in FIG. 10, the machine-based symbol detection and decoding operations of this illustrative embodiment is similar to the embodiment of FIG. 6 and similar reference numerals (increased by 200) refer to similar steps. Dynamically, the method of this embodiment is implemented in a similar way as that of the embodiment of FIG. 6 except the following:

The method of FIG. 10 is now implemented multiple times concurrently, each implementation being for a different image sensing device, 502, 504, etc.

The step 622 of establishing symbol positions is adapted to that there are now two special symbols, specifically reserved to hold the "Begin" and "End" symbols. Previously there was only the "Begin" symbol.

The step 622 of establishing reading direction is adapted to the apriori knowledge, specific to this embodiment.

A new step 626 that computes space positions of the symbols of a word on a given label 503 has been added.

Thus, images are acquired at 602 and output at 604. Symbol angles and confidences are extracted at 608 and output at 610. Pixels are labeled at 612 and output at 616. Symbols are grouped at 618 and output at 620. Symbol positions as well as a symbol reading direction are established at 622. The output of this step at 624 is then subjected to the new step of computing space positions at 626.

The step 622 which establishes the reading direction (RD in FIG. 8B), using the apriori knowledge on special symbol (B and E) selection policy and the symbol position geometry is done as follows. For each detected group that is available as input 620 and that is not flagged with "anomaly", the (non-identified) adherents with symbol angles that are closest to that of "E" symbol (in double angle) are identified as "E"-symbols. The corresponding symbol angles are quantized to conform to the double of the symbol angle of the "E"-symbol (in this example, the E-symbol is the symbol labeled 18 in FIG. 1). If the number of "E"-symbols among adherents is different than one, the group is flagged with "anomaly". The third symbol in the reading direction is established by choosing it as the symbol which is (position wise) farthest away both from "B"-symbol and "E"-symbol than any other symbol among the adherents, on the left side of the diagonal when one "walks" from "B"-symbol to "E"-symbol. This is achieved with well known algebraic computations known from basic geometry.

The eighth symbol is found in an analogous manner as the third symbol in the embodiment of FIG. 6 by finding the adherent that is closest to both "B"-symbol and "E"-symbol, but on the right side when "walking" on the diagonal. In other words, putting the B in the upper left and the E on the lower right. The remaining symbols are found as those closest to mid-points of lines joining appropriate corners. The second symbol is the one closest to the mid-point joining the "B"-symbol and the third symbol, the fifth symbol is the one closest to the midpoint between "B"-symbol and "E"-symbol. As in the first embodiment, the mid-point interpretation is subject to a predetermined tolerance, here five percent of the respective line-segment length, or else the group is flagged with "anomaly".

The output 624 comprises a list of numerical values representing identified and located words. In this embodiment the first value is an integer representing the number of found words followed by the data stream of each word where the data stream of a word consists of the geometry-confidence value, the number of adherent symbols, in the reading order (when appropriate). The symbol data consists of symmetry order, confidence, double of symbol angle, the x and y coordinates of the origin of the respective symbol.

At 626, the space positions of symbols are computed from the available data 624. As mentioned above, it is possible to calculate the space coordinates, also known as world coordinates, of the symbol positions relative to coordinates fixed to the camera, i.e. in meters. Such calculations, however, require that the concerned camera is calibrated, i.e. its internal parameters are known, and additional computations are applied to the symbol-positions (in pixels) obtained at 624.

According to this embodiment, the cameras are able to perform self-calibration automatically during the application of the reading method of FIG. 10, and thus avoid manual intervention. It turns out that even the external camera parameters (pose and distance) are obtained at the same time since both are calculated simultaneously. In turn, this allows mapping of the symbol positions in image coordinates to space coordinates. The self-calibration is enabled thanks to the fact that there is no correspondence problem to deal with at least for two symbols, because the identity and the position of them are detected at the same time, and without any help of the geometry of symbol positions. For the rest of the symbols geometry is used to avoid or reduce the correspondence problem. Evidently, as an alternative one could use more symbols, e.g. all four corners, as special symbols, as done in lift-truck embodiment, to avoid dependence on symbol geometry all together, depending on the application's trade-off for messages being rich or many versus positions being precise.

FIG. 9 illustrates the symbol surface 32 together with the observing camera 504. Furthermore, the figure shows the used perspective camera model 510. In the model we have illustrated the image plane 512, the image-coordinates, (indicated as x, y), the camera-coordinates fixed to the camera (indicated as $X_C, Y_C, Z_C$), and the position-vector 514 of symbol surface. The image of a world point is the intersection of its position vector (in camera-coordinates) with the image plane. The illustrated position vector 514 is that of a point on the symbol surface. A world-coordinate system $X_W, Y_W, Z_W$ is imagined to have been fixed to the center of the symbol surface at the fifth symbol position (center) of the symbol surface 32 in FIG. 9. Thus, in the world-coordinate system, each symbol-position has a coordinate tuple $(X_W, Y_W, Z_W)$ where $Z_W=0$ for all points of a word, due to the placement of the coordinate system. Furthermore, $X_W, Y_W$ are integer multiples of the distance between two symbol positions (horizontal or vertical), which are ultimately measured in meters. This distance is a design parameter and is known.

The content of the input 624 for step 626 comprises confidence, double of symbol angle, and the x- and y-coordinates (in pixels) in the image plane for each symbol position. Accordingly, for each of the (nine) symbol positions, both the world-coordinates and their corresponding image-coordinates are known since the reading order is known, both on the symbol surface 32 and on the image-plane 512 (FIG. 9). The world-coordinates paired with their corresponding image-coordinates are fed into a method of calibration designed for planar surfaces, and the internal camera parameters are obtained as described below.

The calculation methods for internal camera parameters as well as external camera parameters when the correspondence between world-coordinates and image-coordinates are known, has been extensively studied. With eight or more fiducial points there are efficient methods to pull out the internal parameters of a camera. Here there are nine fiducial points every time the reading method delivers its results (in image-coordinates) at output 622, which is sufficient for the purpose. One such method is disclosed in (Appendix A of) the technical paper authored by Z. Zhang, "A flexible new technique for camera calibration" Microsoft Research, Microsoft Corporation, One Microsoft Way, Redmond, Wash., 98052, MSR-TR-98-71, (1998), the complete disclosure of which is incorporated by reference herein. However, other state of the art techniques will also provide the desired transformation.

The internal parameters do not change in the current context of conveyer-belt surveillance, and better estimates of them can be obtained by remembering previous values and applying (moving) averages. The averages of internal camera parameters can then be used, instead of an instantaneously estimated parameter based on a single acquired image, because they will possess improved accuracy.

In contexts of other applications, even if internal parameters would change, for example due to change of focal length of the camera lens, one can approximate the changing internal parameters as being constant (not changing) for a short period of time. In that period the reading method and the internal parameter estimation can be applied a few times to obtain better estimates of the parameter that is subject to change. Evidently, how many times this averaging can be applied is a trade-off between the available computational and image sensing speed relative the speed of the moving objects (to which the internal parameters usually adapt to), and should be determined from application to application.

Each time internal camera parameters are calculated, external parameters are obtained as a by-product from computations in the art. However, if internal parameters are known, and do not change, it saves time not to need to calculate them after convergence. The result of calculations, the external camera parameters set, comprises a matrix transformation that aligns the world-coordinates, $X_W$, $Y_W$, $Z_W$ with camera coordinates, $X_C$, $Y_C$, $Z_C$, i.e. a rotation matrix, and a position-vector 514 between the two coordinate systems. The position-vector 514 is the vector that joins the origin of camera-coordinates with that of the world-coordinates. The image of the origin of the world-coordinates is therefore the intersection of the position-vector (of the origin) 514 with the image-plane obtained at 622 (FIG. 10). The rotation and translation obtained by the calibration represents therefore the orientation of the symbol surface 32 relative the camera-coordinate system, and the position-vector 514 between the camera and the center of the symbol surface (the fifth (central) symbol position in this example). The obtained translation and rotation is therefore applied to image-coordinates x, y, of symbol positions provided at output 622 to obtain the symbol-positions in the space, (relative the camera-coordinate system).

When the internal parameters are known the minimum number of points needed to pull out external camera parameters is also less. This is because they can be used directly, after that they converge to stable values. It means that the nine points of a word used in this application contain redundant information, helping to increase noise resilience of external parameter estimations.

The output 628 is therefore the input 624 augmented with the world coordinates of the symbols. That is, for words that are not flagged with "anomaly", the output data includes the input 624 followed by the $X_C$, $Y_C$, $Z_C$ coordinates of the fifth (central) symbol, and nine real numbers representing the rotation of the symbol surface with respect to the camera.

The result 628 comprises image coordinates and identities (symbol angles) of symbols in the reading direction, i.e. the identity of the bags are fully decoded up to a translation to ASCII. In this embodiment we leave the translation to ascii codes to the command-centre to offer greater flexibility (and time-gain) as mapping symbol angles to ASCII symbols is a matter of a table-lookup, when the command-centre knows the reading direction. This is because the command-centre may choose to represent the identities of the bags directly in angles, saving time, or use additional symbol families in the future.

Additionally, the result 628 comprises the space coordinates of the tag (display-point of the fifth symbol), as well as the orientation of the tag surface relative the camera, for greatest flexibility for command-centre applications. The space positions and orientations allow to find out if a bag has several tags which allows to estimate the size of a bag, for example to sort baggage automatically with appropriate hardware (not included) according to size for volume optimization of the next transportation. With space information of the tags, it is also possible to reroute baggage with appropriate hardware (not included) see if a bag is removed from the band. It can also enable to cooperate with a face detection and face-recognition system (not included in the embodiment) to see if it is the same person who deposited and retrieved the bag, etc.

Figure 11:
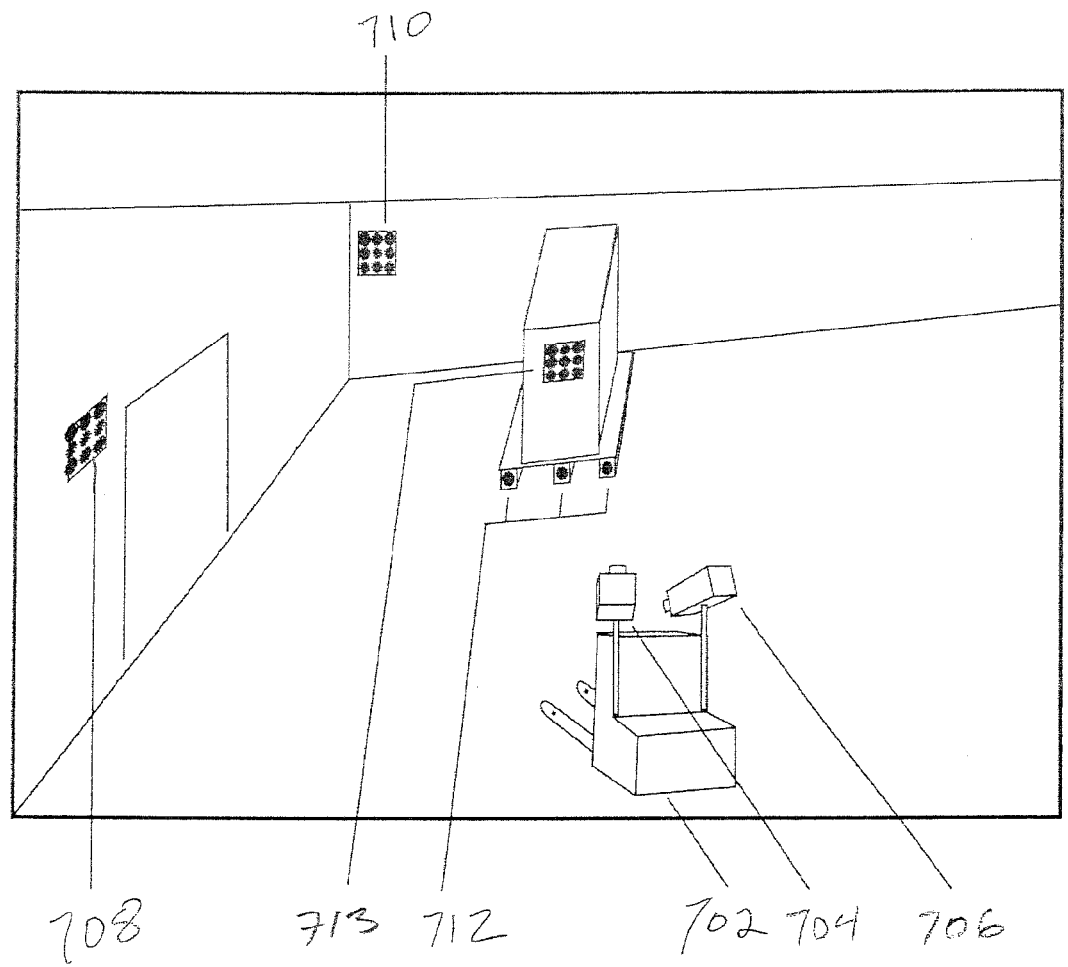
FIG. 11 is a schematic illustration of a third exemplary application of the invention.

A third illustrative method for machine-based detection and decoding of the symbologies described herein is described in conjunction with FIG. 11 illustrating a warehouse fork lift (lift-truck) 702 having two cameras 704, 706. The camera 704 is a forward looking beacon camera while the camera 706 is a floor looking camera. Accordingly, the warehouse is provided with wall mounted beacon words 708, 710 to be read by the beacon camera 704. Pallets to be transported by the fork lift 702 are provided with "pallet words" 712 to be read by the floor looking camera 706. Furthermore, the articles supported on the pallets can include words 713 to be read by the beacon camera 704

Although only one lift-truck is illustrated there can be multiple lift-trucks in the application. On each lift-truck there is a local command center which steers the truck wheels and the lift-forks upon its evaluation of the results of the embodied reading methods that will be detailed below, and in accordance with its mission. There is also a global command center common for all trucks which sends and receives data from the local command centers. The local command center of a truck determines the details of its mission by communicating with the global command center via a radio-communication unit of the onboard PC.

Furthermore, the lift-trucks avoid obstacles (including each other) and navigate over large distances, by constantly updated maps, sonar sensors to avoid obstacles not on the map, and positions of other lift-trucks (as obtained from the global command center). The global command center assures consistency of the maps of the lift-trucks, by diverse updating and broadcasting them during and after displacements of objects (by the lift-trucks) The global command center plans paths and fixes the missions of the lift-trucks at large whereas the local command centers take care of navigation and transporting pallets.

The 3×1 symbols of palette words 712 are printed on a substrate that tolerates physical conditions of the palettes e.g. mechanical impact, wear, and water. Here this is achieved by printing on paper as described in the first embodiment and then coating the paper with a transparent plastic film, by applying heat. Subsequently they are fixed mechanically to palettes by nails. Once decoded, the palette words 712 aid the lift-truck to do fine-maneuvering in such away that the forks are positioned correctly underneath a palette, to assure safe lifting. Another purpose of palette words 712 is to verify that the target-objects to be lifted are really on the palettes (which have unique identities) and thereby to implement transportation and palette resource management, robustly.

Reading of the palette words 712 delivers coordinates as to where symbols of a palette word is located in the image, not in space. This can be sufficient as it allows the local command center to use these coordinates to rotate and translate the truck according to a predetermined behavior, e.g. it rotates the lift-truck such that that the second symbol of the palette word 712 has equal distance to the first and the second and then moves forward until these pixel distances attain a predefined distance in pixels, etc.

The special-symbol selection policy for palette words is similar to that of the embodiment of FIG. 4. The first symbol is always a "B"-symbol which means that as soon as this symbol is located the other symbols are candidates for the second and third symbols. The geometry is such that the "B"-symbol appears always on the left of the other two and the reading direction is from left-to-right starting from the "B"-symbol. The remaining two symbol positions are free to be populated from the remaining members (non "B"-symbols) of the spiral symbol family (FIG. 1) and from members of different symbol families (e.g., from mono-parabolas symbol family (FIG. 16), tri-parabolas symbol family (FIG. 17), and quadri-parabolas symbol family (FIG. 18), in combination. In this embodiment twenty seven different symbols can be used in two symbol positions, on palettes. Accordingly, seven hundred twenty-nine ($27^2$) different palettes, each with a unique identity, are allowed to co-exist in this application.

The symbols of palette word 712, do not rotate around the optical axis of the palette cameras which have fixed distance relative the floor, so that the images of symbol angles can be modeled as not changing due to the motion of the lift-truck. Even here, the symbol angle is $\pi$ periodic just as in the spiral symbol family.

Exemplary parameters for the pallet symbols are set forth in Table 2, below.

TABLE 2

| Parameter | Meaning |
|---|---|
| n | An identifier (e.g., symmetry order) of a symbol family |
| θ | The symbol angle, a value between 0 and $\pi$ radians |
| L | The number of spiral "ridges", e.g. twelve |
| $R_{max}$ | The maximum radius of the symbol, e.g. 256 pixels |
| $\omega_0$ | The maximal local frequency which the writing method will produce in waves of the symbol image |
| $R_{min}$ | The minimum radius (the radius of the white origin) |
| S | The side size of an invisible square containing the symbol, e.g. 512 pixels |

Since words printed on paper, fixed on walls will serve as beacons for self-localization of lift-trucks, a precondition is that they will be visible to lift-trucks as they move from one location of the warehouse to the next. In practice it can be achieved via a combination of i) to have many (different) words on walls, on fixed places, and ii) to make sure that the local command center plans the path of the lift-truck such that the camera of a lift-truck used for long-haul navigation (detailed below) will always see one beacon word. This is like coastal sailing, i.e. never leaving the coast out of sight, where the visible coast is represented by visible (unique) beacon words.

The embodied method uses a floor looking camera 706 on the lift-truck, such that it looks obliquely to the floor to sense the images of palette words 712. The rotation around the optical axis of the camera is such that the palette symbols are approximately on a horizontal line in the image. This camera 706, called the palette camera, is connected to an onboard PC via a cable connection (USB, not illustrated) on which an embodiment of the reading method for palette words is implemented in software. The camera type is the same as in the first embodiment.

The beacon camera 704 is also of the same type as in the embodiment of FIG. 4. Beacon word reading is implemented here as a software executing on the same (onboard) PC as the software of the reading method for palette words.

Reading beacon words are similar to reading the words in the embodiment of FIG. 7 (described above with reference to FIG. 10) except that there is now a different special-symbol selection policy for symbol positions. The reading method of this part of the embodiment is therefore similar to that of FIG. 10. It diverges from the method of FIG. 10 in the step 620 establishing symbol positions and reading direction is modified as follows.

The special-symbol selection policy of the beacon words follows the interpretation given by the row of reference numeral 50 (FIG. 1), as explained above. Accordingly, the symbol reading direction is established using more redundant information to make the navigation fault tolerant. The symbol reading direction is established as follows.

The "B", symbol is known at the beginning of this step for every symbol group. The "R", "L" and "E" symbols are identified among the adherents solely on the basis of the estimated (double) symbol angles as follows. For each "B"-symbol group that is available that is not flagged with "anomaly", the adherents' symbol angles are tested against twice the nominal symbol angles of "E"-, "L"-, and "R"-symbols of the symbol family. If the magnitude of the angular difference (save for an integer multiple of $2\pi$) is less than the corresponding angular difference between symbol angles ($\pi/8$ here) then the tested symbol is identified with the corresponding special symbol of the symbol family. Identification implies that the argument values, i.e. the double of the estimated symbol angles measured from the image in step 608, are replaced with twice the corresponding nominal symbol values, without help of the geometry of symbol positions. Geometry will help to identify other symbol values among the adherents. The symbol positions of the identified "B"-, "E"-, "L"-, and "R"-symbols are the first, the ninth, the seventh and the third, symbol positions, respectively, in the reading direction.

The second, fourth, fifth, sixth, and eight symbol positions are determined as the mid-points of the line-segments between the (now known) first and second, first and seventh, first and ninth, third and ninth, seventh and ninth symbol positions, respecting a predetermined tolerance, (five percent of the respective line-segments here), using the Euclidean distance. The corresponding estimated (double) symbol values are replaced with the double nominal symbol angle from the symbol family.

The data produced by the reading of the beacon words includes a list of numerical values representing identified and located beacon words. In this embodiment the first value is an integer representing the number of found words followed by the data stream of each word where the data stream of a word consists of the geometry-confidence value, the number of adherent symbols, in the reading order (when appropriate). The symbol data consists of symmetry order, confidence, double of symbol angle, the x and y coordinates of the origin of the respective symbol (in the image coordinate system). The world coordinates of the symbols can be computed from the image space coordinates as described above. In the illustrative embodiment, the beacon words and their position in the world coordinates can be used by the command center for automatic navigation of the lift truck as described above.

Figure 12:
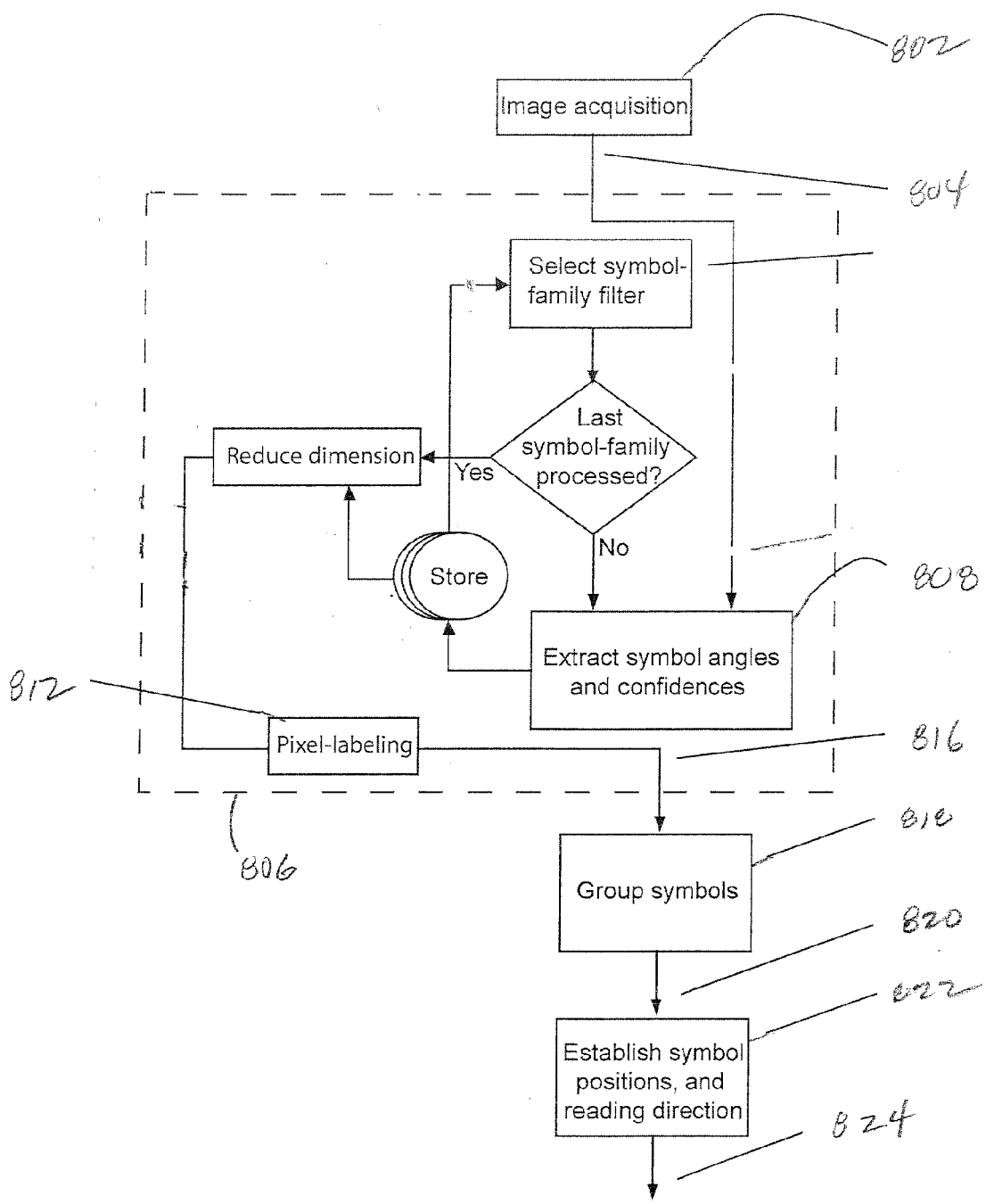
FIG. 12 is a flow chart illustrating a third embodiment of a method for machine-based reading and decoding of a matrix of symbols utilizing any one of the symbologies described herein, which is particularly suited for use in the application of FIG. 11.

In the preferred embodiment, the reading of palette words 712 is carried out according to the machine-based symbol detection and decoding operations of FIG. 12. This illustrative embodiment is similar to the embodiment of FIG. 6 and similar reference numerals (increased by 400) refer to similar steps. Dynamically, the method of this embodiment is implemented in a similar way as that of the embodiment of FIG. 6 except for adaptation in module 806 and in step 822.

More specifically, in module 806, the symbols extracted from an acquired image (804) involves four symbol families. This requires an iterative scheme of the filtering (808) over the four symbol families. The filtering operations of 808 will vary over the symbol families in order to properly extract the symbols and confidences for the given symbol family. In this manner, the iterative scheme selects the filter appropriate for a given symbol family as part of the iterative scheme.

The filtering 808 for each symbol family produces a complex assessment image corresponding thereto. Thus, there will be four assessment images. Each assessment image consists in pixels which have complex values that should be interpreted in relation to a single symbol family. The magnitude of a pixel of such an image represents confidence for the pixel location being at the center of a pattern described by the relevant symbol family. The (angle) argument of a pixel represents the double of symbol angle in the same family. Thus both position and symbol angles are measured at the same time, and relative a single symbol family.

As the assessment images are produced, they are stored for subsequent processing. The stored images have the same size, which is the size of the acquired image 804. In this manner, a stack of assessment images is stored where each complex (image) layer corresponds to an assessment of the acquired image with regard to its symbol family. Conversely, diving through the layers of the stack, keeping the same pixel position throughout, the same number (four here) of complex values is obtained each representing an assessment with regard to a different symbol family, for the current pixel position. The complex values are interpreted in the same way as in the previous embodiments, i.e. the magnitude tells the confidence in that pixel position's being a member of the respective symbol family, whereas the argument estimates the (unquantized double) symbol angle.

When the filtering for the last symbol family has been done, the processing continues to a dimension reduction step. At the entry of this step, the input data contains multiple (four) complex values per pixel. The step reduces the dimension of pixel values from four complex values per pixel to a single complex value per pixel, which is the final assessment of that pixel. However, for the angles of the final assessment to make sense it also must be known from which symbol family each such assessment is originating, because the complex valued final assessment may come from any of the assessment images (four). Accordingly, for each pixel position, the assessment with the highest certainty of the available (four) assessments and its associated symbol family identifier are copied. The symbol family identifier is stored in the respective pixel position in a (separate) symbol family image. The same is done with the complex assessment value, i.e. it is stored in a (separate) final assessment image. The output 822 of this step is the final assessment image and the symbol family image, where the pixel values are complex and integer valued, respectively.

In the pixel labeling step 812, the final assessment image is subjected to the same processing as in the corresponding step as in the embodiment of FIG. 6, which produces a list of symbol data 816 in the output solely based on the assessment image. Here this step is applied to the final assessment image.

As before, in the processing only the magnitudes of pixels (complex) determine which image locations are detected as symbol centers. From the symbol family image, the symbol family corresponding to the detected symbols' (double) angle are pulled out and associated with the detected symbol data (confidence and double angle). Accordingly, the output of this step is the same as in the embodiment of FIG. 6, namely a list of five-tuple data each representing numerical values associated with a symbol. These are, for each symbol, the symmetry order (an integer identifying the symbol family), the magnitude of the complex value, (representing the confidence in symbol position), the argument of the complex value, (double of symbol non-quantized angle), the x-coordinate of the position, y-coordinate of the position, all output at 816.

The grouping step 818 is similar to that of embodiment of FIG. 6. However, when finding the "B"-symbols among the delivered symbol list, now both the symbol angle and the symbol family confirm the "B"-symbol. Previously, compliance of the symbol family was not necessary because there were no other possible symbol families to choose the (zero) angle from. In this embodiment, the symbol (double) angle alone is not enough to conclude on the symbol identity.

The output 820 is thus similar to that of the embodiment of FIG. 6, where, the first value is the number of the words found. This is followed by the data stream of each word, i.e. for each word geometry-confidence value, the number of adherent symbols followed by the data stream of the symbols. The data of a symbol in turn consists of symmetry order, confidence, double of symbol angle, x-coordinate, and y-coordinate.

In step 822, the reading direction among the adherents of a word which have "normal" flag in its "geometry-confidence" are determined. Such words have the expected number of adherent symbols but these need to conform to the expected geometry as well. Accordingly, the adherents of a "B"-symbol are to be found on the same horizontal line in the camera image (because of the camera setup). The "B"-symbol is the first symbol in the reading direction in this embodiment. The adherent that is farthest away from the "B"-symbol is a candidate for the third symbol position.

For horizontal collinearity with the first symbol it is necessary that the third symbol candidate is within a tolerance distance from the horizontal line emerging from the "B"-symbol position. The tolerance distance is calculated as the five percent of the line-segment length joining the "B"-symbol to the third symbol. If the candidate does not comply with geometry the "geometry-confidence" value of the word is set to "anomaly" with no further processing of the word. If the candidate passes the horizontal colinearity test then it is retained as the third symbol. The candidate for the second symbol is the remaining symbol which is closest to the midpoint of the line-segment between the first and the third symbol positions. It is necessary that the candidate is within a tolerance distance from the line segment joining the first and third symbols to accept it as the second symbol. Else, the "geometry-confidence" is set to "anomaly". The tolerance distance is calculated as the five percent of the line segment length joining the first symbol and the candidate symbol.

If the "geometry-confidence" remains "normal", then symbol data are reordered to reflect the reading direction. Also, the symbol angles of the adherents are quantized by choosing the closest symbol in the correct symbol family. The correct symbol family is determined by the symmetry order value of each symbol, whereas the closest symbol within family is the one that has a symbol (double) angle differing from that of the candidate with the angle quantization step (here $\pi/8$) or less.

The output 824 comprises a list of numerical values representing identified and located palette words 712. Namely, the number of found palette words 712 in the acquired image, followed by the data stream of each palette word 712 one after the other. The data stream of a palette word 712 consists of the geometry-confidence value, the number of adherent symbols, followed by as many symbol data in the reading order (when flagged "normal"). The symbol data consists of a five-tuple data representing symmetry order, confidence, double of symbol angle, and the x and y coordinates of the origin of the respective symbol (in the image coordinate system). The x, y image coordinates of the respective symbols of a palette word 712 can be used by the command center to properly position the lift truck as desired. For example, the command center can use these coordinates to rotate and translate the truck according to a predetermined behavior, e.g. it rotates the lift-truck such that that the second symbol of the palette word 712 has equal distance to the first and the second and then moves forward until these pixel distances attain a predefined distance in pixels, etc.

Figure 13:
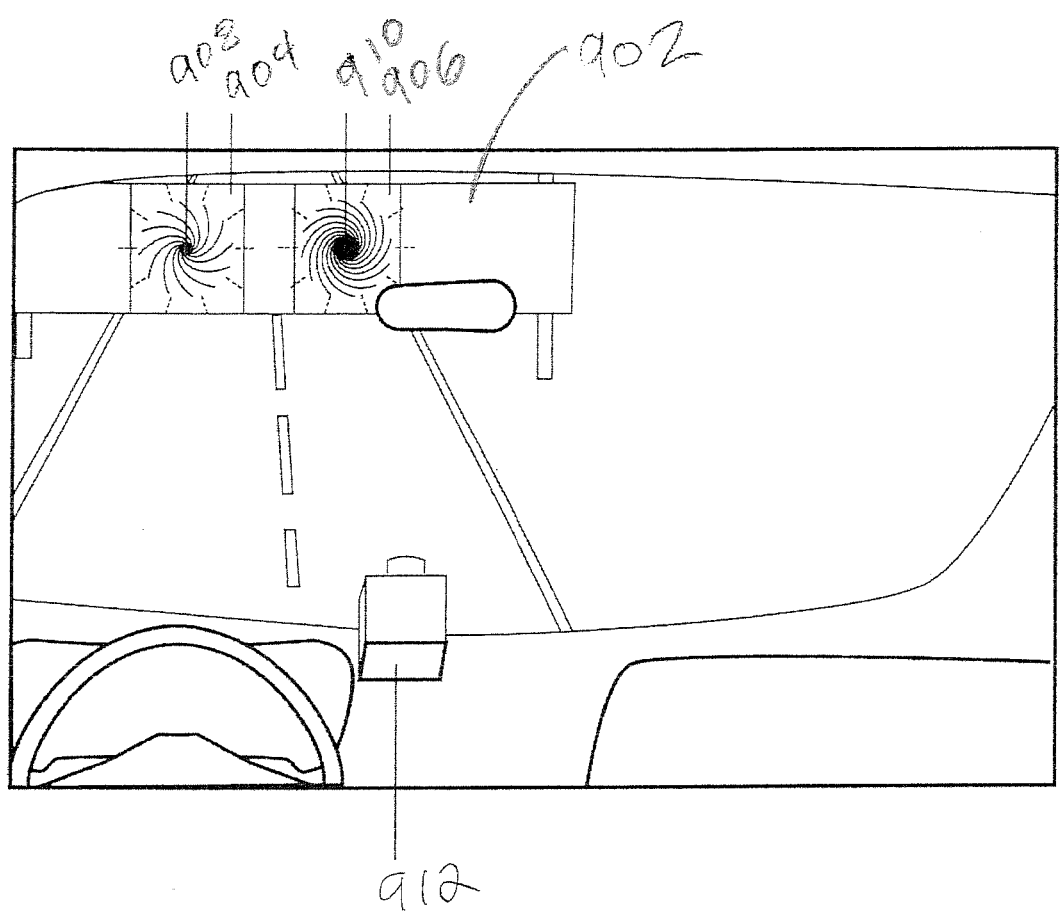
FIG. 13 is a schematic illustration of a fourth exemplary application of the invention.

A fourth illustrative method for machine-based detection and decoding of the symbologies described herein is described in conjunction with FIG. 13 illustrating a motor vehicle information system receiving roadside messages. Here important messages are transmitted to the information system of a car based on the lane where the car is. The symbol surface 902 is implemented as a roadside sign employing Light Emitting Diode (LED) based displays 904, 906. Each display 904, 906 is associated with a lane and they are attached at physical positions 908, 910 above the respective centers of each lane. The displays 904, 906 are read by a camera 912 mounted in or on the motor vehicle. The traffic command center broadcasts lane-specific information by changing the displayed symbols. Each display is for a specific lane and the displays are used to show harmonic symbols from a harmonic congeniality, at a pre-determined pace. Lane specific information from the traffic command center can thus be broadcasted to only the concerned vehicles at higher speeds than the drivers can read and react by reading ordinary text on display panels. For example the message could be to call a mobile phone number which requires both remembering and placing the call or providing important or complex traffic information to the driver. The motor vehicle includes a computer processing system (not shown) that executes software performing machine-based symbol detection and decoding operations as described herein. The computer processing system communicates directly with the camera 912 via a suitable data interface (e.g., USB or the like). The execution of such software automatically reads the words presented on the displays 904, 906 as the vehicle passes by the display. The words can be decoded for communication to the driver (for example, by display on the vehicle's dashboard display, or by conversion to audio data by text-to-speech processing followed by playback of the audio data over the vehicle's audio system). Alternatively, the words can carry navigation information and be used as input to a vehicle navigation system for more optical navigation of the vehicle's route, such as for traffic avoidance. Importantly, both the reading and acting on the coded information is thus handled automatically, whereby the driver's full concentration is devoted to driving safely.

The display-image can be varied at a predetermined pace, e.g. conveniently by use of LED displays to transmit arbitrary messages not limited in bit-lengths, by transmitting words having limited bit-lengths, in a stream, just as in any communication method.

A similar communication mechanism as above is used in the floor-inspecting robot in the first embodiment where the information transmission pace is not constant but the effect is nevertheless the same, because of the behavior of the robot. The robot stops moving when it detects a defect until a new order to move arrives from the command center. At the latter time, the command center has picked up the coordinates where there is a defect, etc.

As mentioned above with reference to FIG. 3, the symbols of the invention can be written as "line art" having no gray values or can be written in "grayscale" having e.g. 256 levels of gray. The metaphor for representing the symbols as gray values involves peaks and valleys representing white and black with "elevations" representing intervening gray values. The invention provides a method for converting line art symbols shown in FIG. 1 into grayscale images such as that shown in FIG. 3. The method is described in two embodiments. The first embodiment is illustrated in FIGS. 14A-14C and the second embodiment in FIGS. 15A-15C. Both embodiments consist of two steps: i) position to elevation transformation, and ii) elevation to gray value transformation. The steps can be performed by a software executing in a PC, but can also be implemented in hardware.

There is an administrative step which invokes the grey-value generation as follows. It calculates the size of the final display-image and reserves sufficient space in the memory, such that the symbols plus some extra space for border and inter-symbol space can be accommodated. For example, in the three symbol embodiment (FIG. 5A) this amounts to 1686 rows by 562 columns because the space between the symbols as well as the margins are uniform, 50 pixels, horizontally and as much vertically around each symbol, where every symbol is 512×512 pixels.

For most pixel locations of a symbol, the administrative step demands a symbol gray value generation with the symbol angle, from the position-to-gray value transformation step. To be precise, all pixel positions of the (512×512 pixels) would-be symbol square in the reserved memory are visited but only at locations that are between the minimum and the maximum radii, the position-to-gray value transformation step is invoked. The obtained gray value is stored in the corresponding location within the symbol square, the display-image of a symbol in the memory. The minimum and maximum radii are prerequisite parameters described above. Display-image generation for a symbol is continued until the gray values of all of its Cartesian coordinates (x, y) are generated. Similarly, all symbols of the word are generated in their respective memory locations, in the final display-image.

Turning now to the first embodiment of FIGS. 14A-14C, the methodology is invoked for a certain point (x, y). The position-to-Elevation transformation step 1002 determines at what elevation this point is, in an abstract terrain. Every display-image point (of a symbol) is on a spiral having the same elevation above the x, y symbol image plane. Accordingly, moving along this spiral in the (x, y) image plane, the elevation does not change. The elevation along this spiral corresponds to the constant k described above in connection with the equation of spirals (equation (1)). In an illustrative embodiment, the constant k is premultiplied with $\omega_0$ to obtain a sufficiently steep terrain such that the symbol image has the desired visual properties in terms of the number of spiral ridges (peaks) and the level of undesired clutter around the symbol center. The mission of the position-to-elevation step 1002 is to automatically calculate the corresponding constant which is output at 1004. After this, the elevation-to-gray value transformation step 1006 outputs a gray-value 1008 to every constant input 1004 which is fed into it.

The operations of the position-to-elevation step 1002 is detailed in FIG. 14B. The operations take the Cartesian coordinates (x, y) and transforms the pair to the corresponding polar coordinates (r, $\phi$), via a well known Pythagorean rule and the arctangent function. The coordinate transformation continues with log-polar transformation 1010, i.e. the natural logarithm is applied on the modulus r to yield log r (called $\xi$) whereas the angular coordinate $\phi$ (called $\eta$ for the sake of good order) exits untouched. Thus, the Cartesian coordinates (x, y) of the original point have been transformed to another pair of coordinates ($\xi$, $\eta$) at the exit of the log-polar transformation module 1010.

The obtained pair of values ($\xi$, $\eta$) are called the log-polar coordinates of the original point. Log-polar coordinates are mathematically defined by the tangent curves of log-polar spiral curves which in turn constitute a special case of harmonic curves. The log-polar coordinate pair ($\xi$, $\eta$) are treated as a vector and will be projected to a specific direction, via the scalar product of vectors in the next operation.

Concurrently, the symbol angle $\theta$, which is an input or design parameter to the method, is transformed to a vector by applying the trigonometric functions cosine (at 1012) and sine (at 1014) to the symbol angle. These are the direction cosine and the direction sine of the symbol angle and conform the symbol direction (cos $\theta$, sin $\theta$), or symbol direction vector. The log-polar coordinate vector is projected onto symbol direction (via the scalar product of the two vectors) in the remaining operation. This is done by multiplying the corresponding elements of the vectors and then summing the resulting numbers. The total is evidently another number (real valued here), a scalar. The scalar is multiplied with the other design parameter $\omega_0$, which is unchanged when producing a single symbol, yielding another scalar. This is the output 1004, which is called elevation because it is beneficial to place the output scalar in relation to the input parameters, the Cartesian coordinates (x, y) in the image. The Cartesian coordinates, are the only input parameters that vary dynamically when producing a single symbol.

The transformation 1002 thus obtains a scalar for every point of the input image and one can imagine putting it on the top of the display-image point at a height corresponding to the numerical value of the scalar. Evidently, the elevation must be interpreted as depth (instead of height) when the scalar is negative. The limits of the height or the depth are decided only by bit-depth used for representing real numbers, because all calculations are assumed to take place in floating point variables with sufficient bit-length. The embodiment uses 32-bits floating point number representation, and the corresponding floating point calculations adapted to this length. However, other floating-point lengths will give satisfactory symbols, depending on the quality demands the application places on symbols.

The operation of the elevation-to-gray value transformation module 1006 is detailed in FIG. 14C. The operations subject the elevation scalar 1004 to a pure scalar transformation limiting the height and depth of the elevation, because otherwise would require a huge number of gray-levels per pixel, which is not provided by inexpensive printers nor by inexpensive cameras which will analyze images printed by such printers. To this end the transformation uses a periodic function, a cosine, in this module, to map the elevation first to a (real) scalar between minus one and one. Thereby, the elevation is transformed to a well behaving periodic function instead of being ever increasing as the image point (x, y) goes away from the origin, the symbol center. The step will produce more, or less tight waves full of symmetries as dictated by the log-polar transformation in the previous module 1002, depending on the maximum wave frequency $\omega_0$, which is a predetermined parameter. The bias one is added to avoid negative values since gray values are normally represented as positive values. The outcome is multiplied by 0.5 to force the final output 1008 to be between zero and one.

In this context one means the white and zero means the black shade of the gray scale. According to the depth of pixel-values allocated by the administrative step, the span zero to one is then remapped to minimum and maximum gray value (not shown) as a consequence of the application at hand. For an eight bit gray value image, which is used in this embodiment, the maximum value one means the shade labeled by 255 and zero means the shade labeled by 0. Other real values are mapped linearly (by rounding off) to nearest integers in the span between 0 and 255. This is how the gray-scale values of the symbol of FIG. 3 is obtained.

Turning now to the second embodiment of FIGS. 15A-15C, the Position-to-Elevation transformation module 1102 differs in one essential way from that of the first embodiment. Not surprisingly this is the sub-module performing the harmonic coordinate transformation 1110 of FIG. 15B. The rest of the transformation remains the same. As before certain input parameters are prerequisited, e.g. the symbol angle $\theta$ and max frequency $\omega_0$ are input variables. An additional input variable n, which corresponds to the symmetry order of a selected symbol family) is provided that varies according to the symbol family. As in the first embodiment, only the image point coordinates (x, y) vary according to the location for which a gray-value will be produced.

The harmonic coordinate transformation is driven dynamically by the polar coordinates of the current image point (r, $\phi$) regardless of their family. The corresponding transformation from (x, y) to (r, $\phi$) coordinates is shown in FIG. 15B. The results are fed to the sub-module 1010 in the illustration. The subsequent harmonic coordinate transformation submodule 1010 delivers a pair of real values, the harmonic coordinates ($\xi$, $\eta$) at its output which is a coordinate vector and projected on the symbol direction vector 1112, 1114 just as in the spirals family case. The projection technique is identical as that of the first embodiment. That is, the projection consists of the multiplication of the corresponding vector elements of the symbol direction vector (cos $\theta$, sin $\theta$), and the harmonic coordinates vector ($\xi$, $\eta$) and summing them up, yielding in the elevation 1104. The numerical values at this point 1104 are specific to the symbol being produced because we have a different $\theta$ for each symbol apart from that the harmonic symbol family (via n) is also influencing the result, which is an elevation.

The symmetry order n is a direct input parameter to the sub-module 1110 to allow it to behave differently each time the symmetry order n is changed (here to values −1, 1, and 2). More specifically, the sub-module 1110 exponentiates the r coordinate to the power n/2+1. Concurrently, the sub-module 110 multiplies the angular coordinate $\phi$ with n/2+1 and computes the cosine and sine function values of the resultant product. The cosine and sine functions result are individually multiplied with the already calculated exponentiated radius. The resulting pair of numerical values are the coordinates ($\xi,\eta$) that are used to produce a scalar at 1104 similar to that in the first embodiment.

The operation of the elevation-to-gray value transformation module 1106 is detailed in FIG. 15C. The operations subject the elevation scalar 1104 to a transformation which is not continuous in gray values. Instead, the resulting symbol image is halftone with only white (one) or black (zero) pixels. This implementation of the transformation utilizes a thresholding operation that yields black pixel values at pixel locations where the transformed gray value is below a numerical threshold value, whereas the remaining pixel locations are white (larger than) are set to one (white). The threshold value is preferably a predetermined, arbitrary real number between zero and one.

The symbologies presented above differentiate between symbols utilizing symbol angles. Such angles are dimensionless quantities as opposed to distances between bar code lines or other features which are metric quantities, e.g. those between lines in bar-codes. More generally, the symbologies of the present invention employ symbols with isocurves that are differentiated amongst one another utilizing characteristic directions along the isocurves of the symbols. More particularly, differentiation amongst symbols can be defined by the intersection angles of isocurves with one or more predetermined reference curves. Such reference curves do not need to be explicitly marked into symbol images as they are implicitly available. For example, the reference curves (i.e., concentric circles for the symbology of FIG. 1) can be overlayed on a symbol image for pedagogical purposes, or for quality control of the encoded information. Also, the reference curves in themselves do not have to be unique per symbol family. As long as one can uniquely identify the characteristic direction of the isocurves of a given symbol by some method, then one is assured that the characteristic direction of the given symbol carries the encoded information.

In the preferred embodiment, the isocurves that make up a given symbol are defined by Harmonic functions. Such harmonic isocurves are referred to as "harmonic curves" herein, and are preferably defined as curves $h(r,\phi)$ in a plane that fulfill the partial differential equation (4), given in polar coordinates.

$$\nabla^2 h = \frac{\partial}{\partial r}\frac{1}{r}\frac{\partial h(r, \varphi)}{\partial r} + \frac{1}{r^2}\frac{\partial^2 h(r, \varphi)}{\partial \varphi^2} = 0 \quad (4)$$

According to this definition of "harmonic curves", different isocurve symbologies can be created that also qualify as harmonic curves. Examples of symbologies whose symbols utilize harmonic curves are illustrated in FIGS. 16-18.

Figure 16:
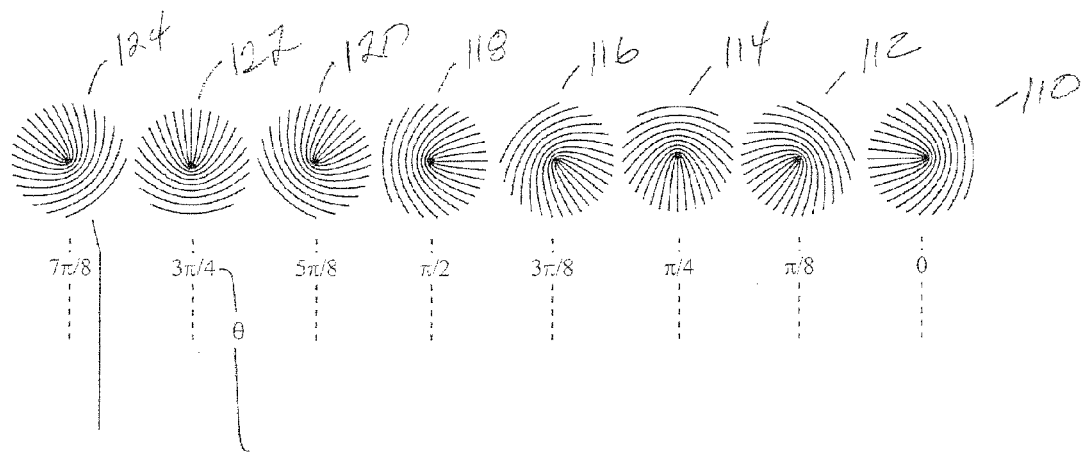
FIGS. 16-20 are representations of exemplary optical machine-readable data code symbologies according to alternate embodiments of the present invention.

FIG. 16 shows an illustrative symbology that includes eight "mono-parabola" symbols 110, 112, 114, 116, 118, 120, 122, and 124.

Figure 17:
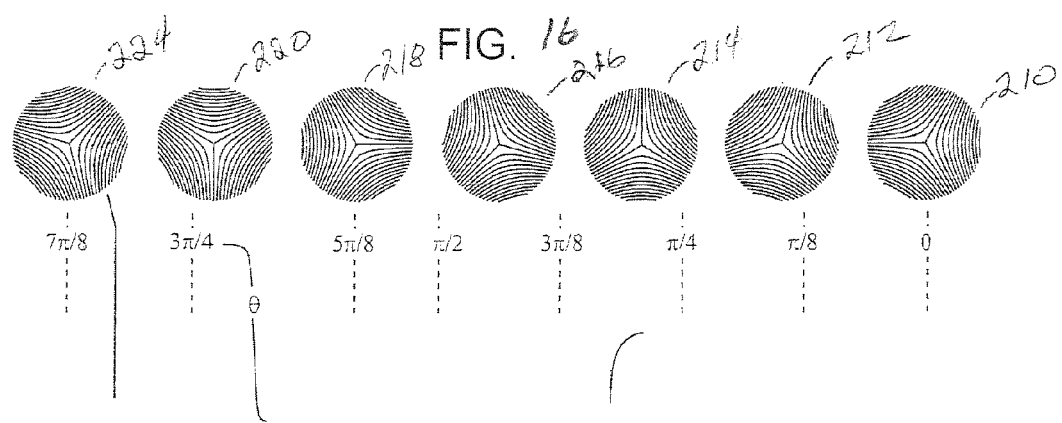

FIG. 17 shows an illustrative symbology that includes eight "tri-parabola" symbols 210, 212, 214, 216, 218, 220, 222, and 224.

Figure 18:
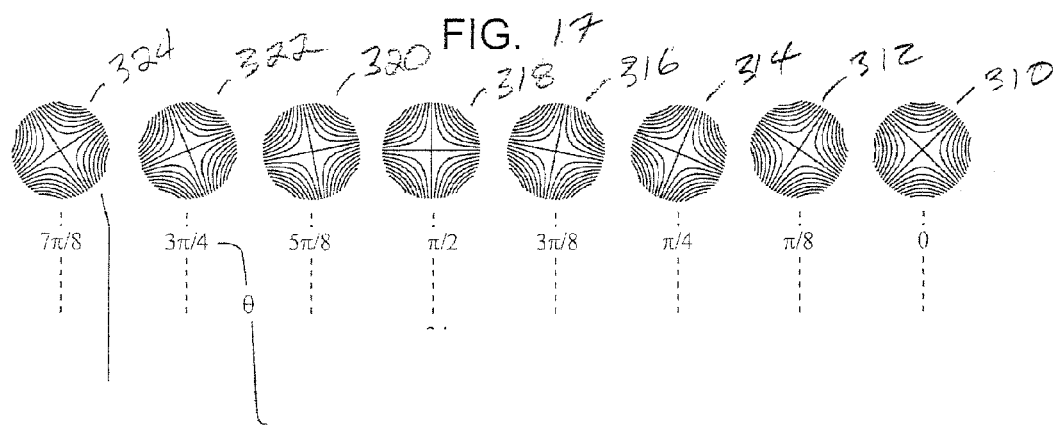

FIG. 18 shows an illustrative symbology that includes eight "quadri-parabola" symbols 310, 312, 314, 316, 318, 320, 322, and 324.

For the symbologies of FIGS. 16-18, it will be appreciated that each of the symbols in a given family are actually identical and convey their message by rotation about their origin. Thus, the symbols in these families are not rotationally invariant.

A set of symbol-families is called a "congeniality". An harmonic congeniality is a symbol family having members (symbols) with isocurves fulfilling partial differential equation (4). Accordingly a symbol which is in a harmonic congeniality is a symbol which has a family and all members of the family fulfill the above equation. Such symbols are called harmonic symbols.

All of the symbologies presented herein are harmonic symbols. Additionally, they are all a member of a well defined family. One discerns one member from another by a specific directional parameter, which is referred to as the symbol θ herein. One discerns families from each other by another parameter, called "symmetry order", which is described in detail below.

Mathematically, each symbol family in an harmonic congeniality is characterized by its symmetry order, n, which is an integer. The spiral symbology of FIGS. 1, 3B and 3C has n=-2, the mono-parabola symbology of FIG. 16 has n=-1, the tri-parabola symbology of FIG. 17 as n=1, and the quadri-parabolas symbology of FIG. 18 as n=2.

The isocurves of the symbols of the parabolic symbologies of FIGS. 16-18 are defined according to their symmetry order by equation (5).

$$r^{(\frac{n}{2}+1)}\left[\cos(\theta)\cos\left(\left(\frac{n}{2}+1\right)\varphi\right) + \sin(\theta)\sin\left(\left(\frac{n}{2}+1\right)\varphi\right)\right] = k \quad (5)$$

That is all the points on the isocurves of the symbols of FIGS. 16-18 satisfy equation (5).

The parameter θ in equation (5) can be referred to as the symbol angle because it has the same role as the angle θ in the spiral symbol family. Namely, by changing θ appropriately, different symbols within a symbol family are produced. Equation (5) can be said to include the definitions (equations 6 and 7) of a coordinate pair (ξ, η) where $$\xi = r^{(\frac{n}{2}+1)}\left[\cos(\theta)\cos\left(\left(\frac{n}{2}+1\right)\varphi\right)\right] \quad (6)$$

and $$\eta = r^{(\frac{n}{2}+1)}\left[\sin(\theta)\sin\left(\left(\frac{n}{2}+1\right)\varphi\right)\right] \quad (7)$$

The parameter n is the symmetry order, and takes integer values, as mentioned above. It dictates the family of the parabolic symbology represented by equation (5).

Note that by setting n=-2 (which represents the spiral family) in equation (5) does not deliver an equation of a curve at all, because the coordinate variables (r, φ) will instead vanish elegantly. The spirals have a different equation, i.e. Equation (1), but both equations (1) and (5) fulfill the above partial differential equation (4). A concrete consequence is that the intersection angles of any of the four embodiments are all described by $$\theta - \left(\frac{n}{2}+1\right)\varphi$$

along any concentric circle (e.g. FIG. 2). This is easily verified by setting, for example n=-2 and see that the intersection angles of the spiral family are unchanged by changing φ and remain constant with regard to θ. However, the intersection angles of the other curves with concentric circles will evolve very predictably with changing φ. Mono-parabolas will thus evolve as $$\theta - \frac{1}{2}\varphi,$$

tri-parabolas as $$\theta - \frac{3}{2}\varphi,$$

and quadri-parabolas as θ−2φ, etc.

There are an infinite number of such symbol families which can be constructed by changing n to arbitrary integers, image resolution, and usefulness permitting.

Except for the members of the spiral family, when a symbol from any one of the other symbologies is rotated, its symbol angle is changed as evident from FIGS. 16-18. Each symbol can thus be obtained from any other by rotating it appropriately within a family except the spiral symbol family. The physical significance of θ is no longer the (bending) angle that the isocurves intersect concentric circles (compare with FIG. 2) with, but it represents pure rotation.

Figure 19:
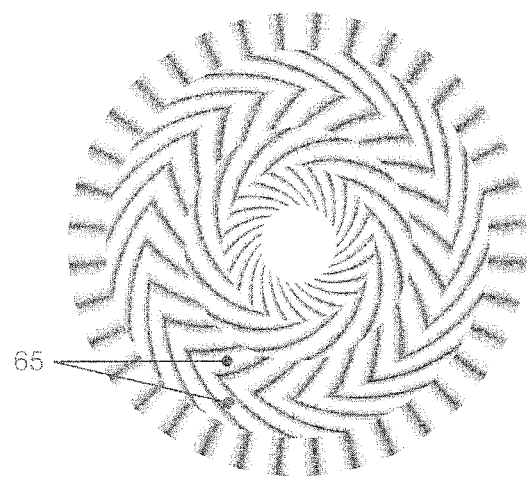

However, isocurves do not have to be defined by harmonic functions for this purpose. For example, FIG. 19 shows a composite symbol where there are five annuli 65. Such a symbol can be produced by using the symbol writing method of the second embodiment of FIGS. 3A and 3B (FIGS. 14A-14C) for each one of the five annuli 65 with minimum and maximum radii corresponding to the respective annuli, and then adding the resulting images appropriately into a single composite symbol. In alternate embodiments, parts of the isocurves from any of the symbologies described herein can be chosen to be placed in the five annuli. This results in thirty-two symbols to choose among, yielding a symbol family having $32^5=33,554,432$ different members, amounting to twenty-five bits. Nonetheless, none of the isocurves are harmonic, because they are not even continuous across annuli boundaries, and all of the information is yet stored in the characteristic directions of the isocurves of the respective symbols.

Figure 20:
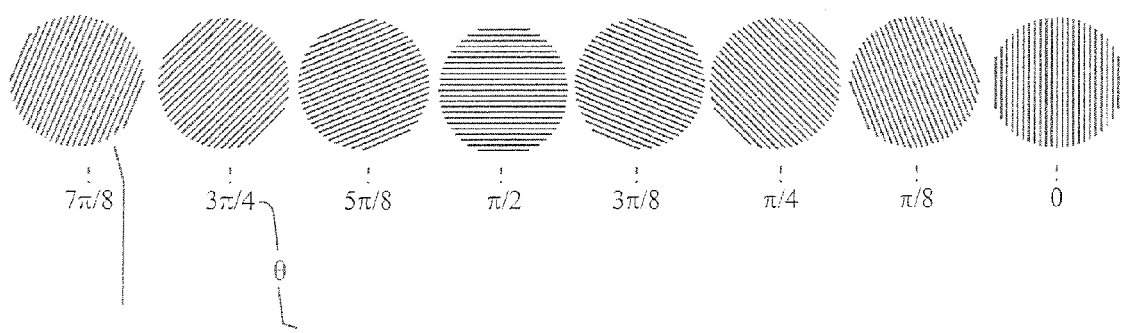

In another alternative embodiment, FIG. 20 shows symbols from the lines symbol family, that is capable of encoding information in symbol angles just like any other symbol families presented herein. In this symbol family, a symbol's isocurve directions are the simplest of all possible isocurves because they do not change. Most importantly, one could construct with them curve families that have piecewise constant directions, and thereby embed different information in different parts of a symbol image, in analogy with FIG. 19. Thus, in all embodiments, harmonic curves only served as a convenient tool to produce direction information of isocurves that are predictable with the information that is to be encoded, (θ variable in the embodiments).

The symbols of a given symbology of FIGS. 16-18 and 20 can be detected and decoded by using appropriate image processing techniques similar to the methodology of FIG. 6. For the symbology of FIG. 19, the symbols can be detected and decoded by using appropriate image processing techniques similar to the methodology of FIG. 12. Yet, instead of using one filter with a fixed size per symbol family, one would need five filters per symbol family, one for each annulus part. These five filters of the same symbol family would differ in their spatial support, i.e. where the non-zero filter coefficients are within a filter) such that the spatial support would be the five different annuli. In the embodiments disclosed above the extraction step uses filters with fixed spatial supports being a fixed annulus. If the symbol angle is the same at all radii of a symbol in an observer-image, as is the case with the symbols of in FIGS. 1 and 4-6, then only one filter is sufficient to pull out the encoded information.

Spiral symbol families have particularly attractive properties as their symbol angles are rotation and scale invariant. The invariance rotation, strictly speaking, concerns rotation with any amount around the camera axis $Z_C$, FIG. 9. However, they still do not change significantly even if the rotation is around the remaining two axes, $X_C$, $Y_C$ and significant. In experiments we conducted up to approximately π/3 radians did not deteriorate symbol angle decisions in such (out-of-camera-axis) rotations. Spirals symbol family members can be also used to mark symbols using physical quantities other than directions to encode information, (bar codes and the analogues of U.S. Pat. No. 5,612,524) to be found in large areas as a help to decode them with their respective reading methods. For example, one can mark (and track them if they move), up to eight different bar code locations from several meters and from different view angles using a single spiral symbol within a single camera view.

Moreover, to be decoded, the individual spiral symbol images of a word need not be printed or otherwise be displayed on a single planar surface. It is possible to use several planes for a word, where on each plane one can have a sub-set of the symbols (of the same word). Notably, in three planes intersecting in a point, such as the corners in a ceiling, or corner of a box the reading direction can be uniquely recovered from its observer-images. Accordingly, the reading direction can be decodable even if a word is a multi-plane word. Such multi-plane words are useful to locate, identify and track corners of rooms or corners of human made objects such as boxes.

There have been described herein several optical machine readable data code symbologies, technologies for printing and/or displaying such symbologies as well as technologies for detecting and decoding (reading) such symbologies. Such technologies can be embodied in software loadable and executable on a standard PC. Alternatively, such technologies can be embodied in other means, such as digital signal processing platforms and dedicated hardware circuitry such as FPGAs and the like. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A method for conveying data in a machine-readable encoded form, the method comprising:
    inputting said data;
    using a symbol mapping that maps predetermined alpha-numeric data to individual symbols belonging to an alphabet of machine-readable symbols to encode said data into a set of the machine-readable symbols of the alphabet, wherein each machine-readable symbol of the alphabet is represented by a plurality of isocurves, and wherein differentiation amongst at least two machine-readable symbols of the alphabet is dictated by at least one characteristic defined by bending of the isocurves of the at least two machine-readable symbols of the alphabet; and
    generating a visual depiction of the set of machine readable symbols.

2. A method according to claim 1, wherein:
    the generating involves printing the set of machine-readable symbols of the alphabet.

3. A method according to claim 1, wherein:
    the generating involves displaying the set of machine-readable symbols of the alphabet.

4. A method according to claim 1, wherein:
    the isocurves of the machine-readable symbols of the alphabet comprise a predetermined number of symmetric spiral features that extend radially from their respective center.

5. A method according to claim 4, wherein:
    an angle θ signifies the angle at which the spiral features of a given machine-readable symbol cross a circle concentric with the center at an arbitrary point in a given spiral feature, the circle not depicted visually as part of the given machine-readable symbol, wherein the angle θ is a characteristic defined by bending of the isocurves of the given machine-readable symbol that uniquely identifies the given machine-readable symbol amongst other machine-readable symbols of the alphabet.

6. A method according to claim 4, wherein:
the spiral features are selected from the group including a spiral line, a gray-scale spiral feature, and a half-tone spiral feature.

7. A method according to claim 1, wherein:
the isocurves of the machine-readable symbols of the alphabet are harmonic isocurves.

8. A method according to claim 7, wherein:
the harmonic isocurves are defined by points that satisfy the partial differential equation of the form $$\nabla^2 h = \frac{\partial}{\partial r} \frac{1}{r} \frac{\partial h(r, \varphi)}{\partial r} + \frac{1}{r^2} \frac{\partial^2 h(r, \varphi)}{\partial \varphi^2} = 0.$$

9. A method according to claim 1, wherein:
the set of machine-readable symbols of the alphabet is visually depicted for autonomous vehicle control.

10. A method according to claim 1, wherein:
the set of machine-readable symbols of the alphabet is visually depicted on a label secured to baggage and used for baggage handling purposes.

11. A method for reading data in a machine-readable encoded form, the method comprising:
capturing an image of a set of machine-readable symbols belonging to an alphabet of machine-readable symbols, wherein each machine-readable symbol of the alphabet is represented by a plurality of isocurves, wherein differentiation amongst at least two machine-readable symbols of the alphabet is dictated by at least one characteristic defined by bending of the isocurves of the at least two machine-readable symbols of the alphabet;
processing the image to extract characteristics for the set of machine-readable symbols of the alphabet as well as confidences associated therewith, and pixel coordinates for the origins of the set of machine-readable symbols of the alphabet, wherein the characteristics for the set of machine-readable symbols of the alphabet include at least one characteristic defined by bending of the isocurves for the at least two machine-readable symbols of the alphabet;
grouping the set of machine-readable symbols of the alphabet into words;
establishing symbol positions and a reading direction for each word; and
using a symbol mapping that maps predetermined alphanumeric data to individual symbols belonging to the alphabet of machine-readable symbols to output data representing a sequence of machine-readable symbols of the alphabet for each word.

12. A method according to claim 11, wherein:
the processing involves filtering to identify characteristic directions for the set of machine-readable symbols of the alphabet as well as confidences associated therewith.

13. A method according to claim 12, wherein:
the filtering involves the Generalized Structure Tensor (GST) method.

14. A method according to claim 12, wherein:
the processing involves centroid filtering to identify the pixel coordinates for the origins of the set of machine-readable symbols of the alphabet.

15. A method according to claim 11, wherein:
the set of machine-readable symbols of the alphabet is printed on a label.

16. A method according to claim 11, wherein:
the set of machine-readable symbols of the alphabet is displayed on a display device.

17. A method according to claim 11, wherein:
the isocurves of the at least two machine-readable symbols of the alphabet comprise a predetermined number of symmetric spiral features that extend radially from their respective center.

18. A method according to claim 17, wherein:
an angle θ signifies the angle at which the spiral features of a given machine-readable symbol cross a circle concentric with the center at an arbitrary point in a given spiral feature, the circle not depicted visually as part of the given machine-readable symbol, wherein the angle θ is a characteristic defined by bending of the isocurves of the given machine-readable symbol that uniquely identifies the given machine-readable symbol amongst other machine-readable symbols of the at least two machine-readable symbols of the alphabet.

19. A method according to claim 17, wherein:
the spiral features are selected from the group including a spiral line, a gray-scale spiral feature, and a half-tone spiral feature.

20. A method according to claim 11, wherein:
the isocurves of the machine-readable symbols of the alphabet are harmonic isocurves.

21. A method according to claim 20, wherein:
the harmonic isocurves are defined by points that satisfy the partial differential equation of the form $$\nabla^2 h = \frac{\partial}{\partial r} \frac{1}{r} \frac{\partial h(r, \varphi)}{\partial r} + \frac{1}{r^2} \frac{\partial^2 h(r, \varphi)}{\partial \varphi^2} = 0.$$

22. A method according to claim 11, wherein:
the data is processed for autonomous vehicle control.

23. A method according to claim 11, wherein:
the set of machine-readable symbols of the alphabet is visually depicted on a label secured to baggage and the data is used for baggage handling purposes.

24. A system for reading data in a machine-readable encoded form, the method comprising:
a camera for capturing an image of a set of machine-readable symbols belonging to an alphabet of machine-readable symbols, wherein each machine-readable symbol of the alphabet is represented by a plurality of isocurves, wherein differentiation amongst at least two machine-readable symbols of the alphabet is dictated by at least one characteristic defined by bending of the isocurves of the at least two machine-readable symbols of the alphabet; and
an image processor for processing the image, the processing adapted to perform a sequence of operations including
i) extracting characteristics for the set of machine-readable symbols of the alphabet as well as confidences associated therewith, and pixel coordinates for the origins of the set of machine-readable symbols of the alphabet, wherein the characteristics for the set of machine-readable symbols of the alphabet include at least one characteristic defined by bending of the isocurves for the at least two machine-readable symbols of the alphabet;
ii) grouping the set of machine-readable symbols of the alphabet into words;

iii) establishing symbol positions and a reading direction for each word; and iv) using a symbol mapping that maps predetermined alphanumeric data to individual symbols belonging to the alphabet of machine-readable symbols to output data representing a sequence of machine-readable symbols of the alphabet for each word.

25. A system according to claim 24, wherein:
the processing in i) involves filtering to identify characteristic directions for the set of machine-readable symbols of the alphabet as well as confidences associated therewith.

26. A system according to claim 25, wherein:
the filtering involves the Generalized Structure Tensor (GST) method.

27. A system according to claim 24, wherein:
the processing in ii) involves centroid filtering to identify the pixel coordinates for the origins of the set of machine-readable symbols of the alphabet.

28. A system according to claim 24, wherein:
the set of machine-readable symbols of the alphabet is printed on a label.

29. A system according to claim 24, wherein:
the set of machine-readable symbols of the alphabet is displayed on a display device.

30. A system according to claim 24, wherein:
the isocurves of the at least two machine-readable symbols of the alphabet comprise a predetermined number of symmetric spiral features that extend radially from their respective center.

31. A system according to claim 30, wherein:
an angle θ signifies the angle at which the spiral features of a given machine-readable symbol cross a circle concentric with the center at an arbitrary point in a given spiral feature, the circle not depicted visually as part of the given machine-readable symbol, wherein the angle θ is a characteristic defined by bending of the isocurves of the given machine-readable symbol that uniquely identifies the given machine-readable symbol amongst other machine-readable symbols of the at least two machine-readable symbols of the alphabet.

32. A system according to claim 30, wherein:
the spiral features are selected from the group including a spiral line, a gray-scale spiral feature, and a half-tone spiral feature.

33. A system according to claim 24, wherein:
the isocurves of the machine-readable symbols of the alphabet are harmonic isocurves.

34. A system according to claim 33, wherein:
the harmonic isocurves are defined by points that satisfy the partial differential equation of the form $$\nabla^2 h = \frac{\partial}{\partial r} \frac{1}{r} \frac{\partial h(r, \varphi)}{\partial r} + \frac{1}{r^2} \frac{\partial^2 h(r, \varphi)}{\partial \varphi^2} = 0.$$

35. A system according to claim 24, wherein:
the data is processed for autonomous vehicle control.

36. A system according to claim 24, wherein:
the set of machine-readable symbols of the alphabet is visually depicted on a label secured to baggage and the data is used for baggage handling purposes.

37. A system according to claim 24, wherein:
the processing performed by the image processor computes data that defines position coordinates for the set of machine-readable symbols of the alphabet in a world coordinate system from the position of the set of machine-readable symbols of the alphabet in the image.

38. A method for conveying data in a machine-readable encoded form, the method comprising:

inputting said data;

using a symbol mapping that maps predetermined alphanumeric data to individual symbols belonging to an alphabet of machine-readable symbols to encode said data into a set of the machine-readable symbols of the alphabet, wherein each machine-readable symbol of the alphabet is represented by a plurality of isocurves, and wherein differentiation amongst at least two machine-readable symbols of the alphabet is dictated by at least one characteristic defined by bending of the isocurves of the at least two machine-readable symbols of the alphabet; and generating a depiction of the set of machine readable symbols.

* * * * *